US010032203B2

(12) United States Patent
Sharma et al.

(10) Patent No.: US 10,032,203 B2
(45) Date of Patent: Jul. 24, 2018

(54) DYNAMIC PROPERTY SURFACING

(71) Applicant: Microsoft Technology Licensing, LLC, Redmond, WA (US)

(72) Inventors: Shaleen Sharma, Telangana (IN); Prabhat Kumar Pandey, Herndon, VA (US); Ashish Kothari, Telangana (IN); Anirban Saha, Telangana (IN); Hemant Raj, Telangana (IN); Kartheek Reddy Naini, Telangana (IN); Ashwinderjit Kaur, Punjab (IN)

(73) Assignee: Microsoft Technology Licensing, LLC, Redmond, WA (US)

(*) Notice: Subject to any disclaimer, the term of this patent is extended or adjusted under 35 U.S.C. 154(b) by 420 days.

(21) Appl. No.: 14/730,630

(22) Filed: Jun. 4, 2015

(65) Prior Publication Data

US 2016/0239895 A1    Aug. 18, 2016

Related U.S. Application Data

(63) Continuation-in-part of application No. 14/625,510, filed on Feb. 18, 2015.

(51) Int. Cl.
*G06F 3/00* (2006.01)
*G06Q 30/06* (2012.01)
*G06F 3/01* (2006.01)

(52) U.S. Cl.
CPC ..... *G06Q 30/0623* (2013.01); *G06Q 30/0641* (2013.01)

(58) Field of Classification Search
None
See application file for complete search history.

(56) References Cited

U.S. PATENT DOCUMENTS

| 5,630,125 | A | 5/1997 | Zellweger |
| 7,082,426 | B2 | 7/2006 | Musgrove et al. |
| 7,143,339 | B2 | 11/2006 | Weinberg et al. |
| 7,797,203 | B2 | 9/2010 | Zmolek |

(Continued)

FOREIGN PATENT DOCUMENTS

CA    2764056 A1    12/2010

OTHER PUBLICATIONS

CRM, Joe, "Product Catalog Enhancements in Dynamics CRM 2015", Published on: Sep. 18, 2014 Available at: http://www.powerobjects.com/blog/2014/18/product-catalog-enhancements-in-dynamics-crm-2015/.

(Continued)

*Primary Examiner* — Toan Vu
(74) *Attorney, Agent, or Firm* — Christopher J. Volkmann; Kelly, Holt & Christenson, PLLC

(57) ABSTRACT

A computing system comprises, in one example, a display system configured to generate user interface displays and a property surfacing system configured to detect a request to access properties corresponding to a selected unit and to access a unit-property association store that stores one or more association entities. Each association entity associates a property entity with the selected unit. The property surfacing system obtains the properties based on the associated property entity. The computing system comprises a display system controller configured to control the display system to generate a user interface property display with a representation of the properties.

18 Claims, 35 Drawing Sheets

(56) References Cited

U.S. PATENT DOCUMENTS

| | | |
|---|---|---|
| 7,814,428 B2 | 10/2010 | Bicker et al. |
| 7,996,850 B2 | 8/2011 | Massmann et al. |
| 8,209,327 B2 | 6/2012 | Danish et al. |
| 8,249,885 B2 | 8/2012 | Berkowitz et al. |
| 8,700,490 B1 | 4/2014 | Bhaktwatsalam et al. |
| 8,756,121 B2 | 6/2014 | Gonsalves et al. |
| 8,812,371 B1 | 8/2014 | Stephens et al. |
| 9,171,315 B1* | 10/2015 | Jayaram ............ G06Q 30/0222 |
| 9,373,025 B2* | 6/2016 | Amacker ............ G06F 3/0304 |
| 2002/0089550 A1 | 7/2002 | Orbanes et al. |
| 2003/0225778 A1 | 12/2003 | Fisher et al. |
| 2006/0112099 A1 | 5/2006 | Musgrove et al. |
| 2007/0282882 A1 | 12/2007 | Agarwal et al. |
| 2008/0077477 A1 | 3/2008 | McElhiney et al. |
| 2009/0106128 A1 | 4/2009 | Varmaraja et al. |
| 2010/0131881 A1 | 5/2010 | Ganesh |
| 2010/0191619 A1* | 7/2010 | Dicker .................. G06Q 30/02 705/26.1 |
| 2010/0299616 A1* | 11/2010 | Chen ..................... G06Q 10/10 715/753 |
| 2010/0306080 A1* | 12/2010 | Trandal ................. G06Q 10/10 705/26.8 |
| 2011/0004533 A1* | 1/2011 | Soto ...................... G06Q 30/00 705/27.1 |
| 2012/0005044 A1 | 1/2012 | Coleman |
| 2012/0254801 A1 | 10/2012 | Gaffney et al. |
| 2013/0054365 A1* | 2/2013 | Sabur .................... G06Q 50/01 705/14.55 |
| 2013/0054551 A1 | 2/2013 | Lange |
| 2013/0179305 A1 | 7/2013 | Ashkenazi et al. |
| 2013/0318089 A1 | 11/2013 | Tan et al. |
| 2014/0019281 A1* | 1/2014 | O'Dell ............... G06Q 30/0643 705/26.1 |
| 2014/0067626 A1 | 3/2014 | Chikovani et al. |
| 2014/0074649 A1* | 3/2014 | Patel .................. G06Q 30/0631 705/26.7 |
| 2014/0214536 A1* | 7/2014 | Silva .................. G06Q 30/0255 705/14.53 |
| 2014/0222625 A1 | 8/2014 | Swanson |
| 2015/0235389 A1* | 8/2015 | Miller ................ G06Q 30/0643 345/594 |
| 2016/0044119 A1* | 2/2016 | Wirth ..................... H04L 67/22 709/204 |
| 2016/0117740 A1* | 4/2016 | Linden ............... G06Q 30/0277 705/14.66 |
| 2016/0239164 A1 | 8/2016 | Sharma et al. |

OTHER PUBLICATIONS

Yu, et al., "Domain-Assisted Product Aspect Hierarchy Generation: Towards Hierarchical Organization of Unstructured Consumer Reviews", In Proceedings of Conference of Empirical Methods in Natural Language Processing, Jul. 27, 2011, pp. 140-150.

Kim, et al., "Catalog Integration for Electronic Commerce through Category-Hierarchy Merging Technique", In Proceedings of 12th International Workshop on Research Issues in Data Engineering: Engineering E-Commerce/E-Business Systems, Feb. 24, 2002, 6 pages.

"SmartCollection", Published on: May 23, 2013 Available at: http://docs.shopify.com/api/smartcollection.

"Configurator", Published on: Apr. 24, 2012 Available at: http://www.oracle.com/us/products/applications/ebusiness/scm/051314.html.

Product Configurator, Published on: Feb. 22, 2012 Available at: http://www-01.ibm.com/software/commerce/products/product-configurator/.

Application and Drawings for U.S. Appl. No. 14/625,510, filed Feb. 18, 2015, 56 pages.

Non-Final Office Action for U.S. Appl. No. 14/625,510 dated Jan. 24, 2017, 14 pages.

* cited by examiner

| | | | | | |
|---|---|---|---|---|---|
| ACME CRM | ≡ | Sales \| ▼ Products \| ▼ Product Family: Tabl... \| ▼ | | Search CRM data | First name Last n... John |

PUBLISH  CLONE  DELETE  EMAIL A LINK  RUN WORKFLOW  START DIALOG  RUN REPORT

Product
Product Family Tablet

SUMMARY

| | | | |
|---|---|---|---|
| Name* | Tablet | Unit Group | |
| Product ID* | Tablet | Default Unit | |
| Family Hierarchy | -- | Default Price List | -- |
| Valid From | -- | Decimals Supported | -- |
| Valid To | -- | Subject | -- |
| Description | -- | | |

Status Reason
Draft

PRODUCT PROPERTIES

| Name | Base Property | Data Type | Read Only | Required | Hidden | Default Value |
|---|---|---|---|---|---|---|
| Color | | Option set | No | No | No | |
| Memory | | Option set | No | No | No | |

ADD PROPERTY
528

Notes

Draft

ACME CRM  Sales | ▼ Products | ▼ Product Family: Brand... | ▼  Search CRM data
PUBLISH  CLONE  DELETE  VIEW HIERARCHY  EMAIL A LINK  RUN WORKFLOW  START DIALOG Product
Product Family: Brand X

SUMMARY

| | | | Status Reason |
|---|---|---|---|
| Name* | Brand X | | Draft |
| Product ID* | Brand X | | |
| Family Hierarchy | Tablet | | |
| Valid From | -- | Unit Group | -- |
| Valid To | -- | Default Unit | -- |
| Description | -- | Default Price List | -- |
| | | Decimals Supported | -- |
| | | Subject | -- |

PRODUCT PROPERTIES

ADD PROPERTY

| Name ▲ | Base Property | Data Type | Read Only | Required | Hidden | Default Value |
|---|---|---|---|---|---|---|
| 564 — Color | | Option Set | No | No | No | |
| 564 — Memory | | Option Set | No | No | No | |
| 564 — Warranty | | Option Set | No | No | No | |

NOTES

DRAFT

| ⊖⊕ | 🔒 https://... | | | | | – □ ⊠ |
|---|---|---|---|---|---|---|
| 🏠 ACME CRM | ≡ Sales Products Memory | 🔍 PROPERTY: MEMORY | | | First name Last n... | 🎱 ⚙ ? |
| | | | ⊕ ⊕ Search CRM data 🔍 📑 | | John | |

↙ 576

🗑 Delete

PROPERTY
MEMORY ≡

Name*      Memory      Regarding    🔒Tablet X Pro
Read-Only*    No         Description    --
Required*     No
Hidden*      No

Property Type
Data Type*    🔒 Option Set
Default Value   32 GB ← 580

| ADD OPTION SET ITEM |
|---|

PROPERTY OPTION SET ITEMS

| Name ▲ | Value | Description |
|---|---|---|
| 64 GB | 2 | -- |
| 32 GB | 1 | -- |
| 16 GB | 0 | -- |

↖ 578

Draft

| PROPERTY ENTITY ID | REGARDING UNIT ID | INHERITANCE TYPE | ASSOCIATION STATUS |
|---|---|---|---|
| COLOR | TABLET X | OWNED | ACTIVE |
| MEMORY | TABLET X | OWNED | ACTIVE |
| WARRANTY | BRAND X | OWNED | ACTIVE |
| MEMORY' | TABLET X PRO | OVERRIDDEN | ACTIVE |
| COLOR | BRAND X | INHERITED | ACTIVE |
| MEMORY | BRAND X | INHERITED | ACTIVE |
| COLOR | TABLET X PRO | INHERITED | ACTIVE |
| WARRANTY | TABLET X PRO | INHERITED | ACTIVE |

FIG. 7D

DYNAMIC PROPERTY SURFACING

CROSS REFERENCE TO RELATED APPLICATION

The present application is a continuation-in-part of and claims priority of U.S. patent application Ser. No. 14/625,510, filed Feb. 18, 2015, the content of which is hereby incorporated by reference in its entirety.

BACKGROUND

Computing systems are currently in wide use. Computing systems are often used by organizations in order to assist them in carrying out tasks, activities, and workflows. Some computing systems have entities or data records that represent physical objects or physical units. For instance, some organizations use computing systems that have entities or records that represent products, services, equipment, or other units. Such a computing system may control a surfacing system to surface the entities or records for user interaction. In doing so, the surfacing system surfaces not only a description of the unit, but often a set of properties that correspond to, and can further define, the unit.

The discussion above is merely provided for general background information and is not intended to be used as an aid in determining the scope of the claimed subject matter.

SUMMARY

A computing system comprises, in one example, a display system configured to generate user interface displays and a property surfacing system configured to detect a request to access properties corresponding to a selected unit and to access a unit-property association store that stores one or more association entities. Each association entity associates a property entity with the selected unit. The property surfacing system obtains the properties based on the associated property entity. The computing system comprises a display system controller configured to control the display system to generate a user interface property display with a representation of the properties.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 7A-7D illustrate examples of a unit-property association entity table.

DETAILED DESCRIPTION

Figure 1:
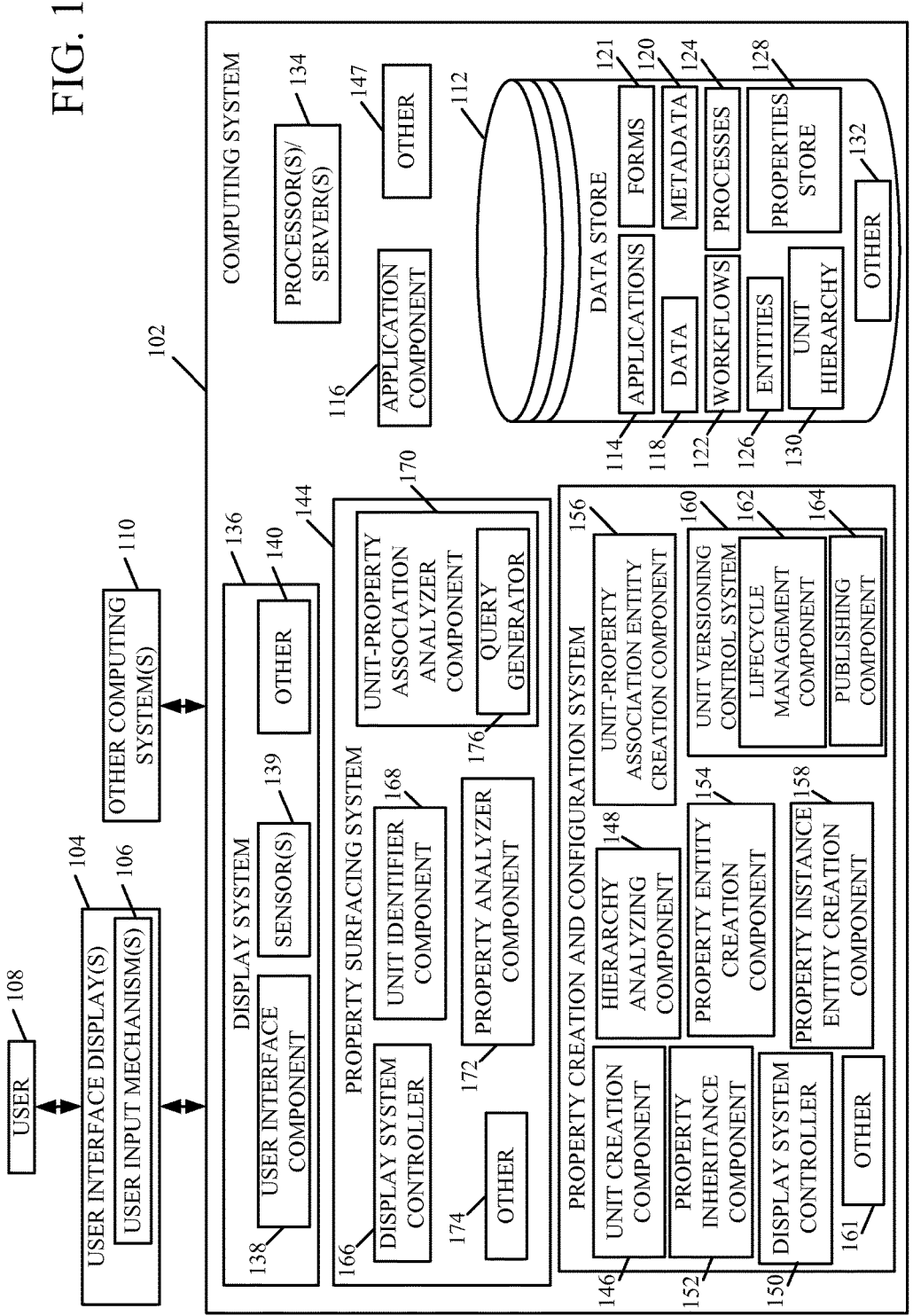
FIG. 1 is a block diagram of one example of a property configuration and surfacing architecture.

FIG. 1 is a block diagram of one example of a property configuration and surfacing architecture 100. Architecture 100 includes a computing system 102 that is accessible by one or more users through one or more user interface displays. Computing system 102 is shown generating user interface displays 104 with user input mechanisms 106 for interaction by user 108. User 108 illustratively interacts with user input mechanisms 106 in order to control and manipulate various parts of computing system 102. In FIG. 1, a single user is illustrated interacting with computing system 102, for sake of illustration. However, in other examples, any number of users may interact with computing system 102. Architecture 100 is also shown communicatively coupled to other computing systems 110.

User 108 can access computing system 102 locally or remotely. In one example, user 108 uses a client device that communicates with computing system 102 over a wide area network, such as the Internet. User 108 interacts with user input mechanisms 106 in order to control and manipulate computing system 102. For example, using user input mechanisms 106, user 108 can access data in a data store 112.

User input mechanisms 106 sense physical activities, for example by generating user interface display(s) 104 that are used to sense user interaction with computing system 102. The user interface display(s) 104 can include user input mechanism(s) 106 that sense user input in a wide variety of different ways, such as point and click devices (e.g., a computer mouse or track ball), a keyboard (either virtual or hardware), and/or a keypad. Where the display device used to display the user interface display(s) 104 is a touch sensitive display, the inputs can be provided as touch gestures. Similarly, the user inputs can illustratively be provided by voice inputs or other natural user interface input mechanisms as well.

Computing system 102 can be any type of system accessed by user 108. In one example, but not by limitation, computing system 102 comprises an electronic mail (e-mail) system, a collaboration system, a document sharing system, a scheduling system, and/or an enterprise system. In one example, computing system 102 comprises a business system, such as an enterprise resource planning (ERP) system, a customer resource management (CRM) system, a line-of-business system, or another business system.

As such, computing system 102 includes applications 114 that can be any of a variety of different application types. Applications 114 are executed using an application component 116 that facilitates functionality within computing system 102. By way of example, application component 116 can access information in data store 112. For example, data store 112 can store data 118 and metadata 120. The data and metadata can define forms 121, workflows 122, processes 124, entities 126 (which can be defined by, or include, properties in a property store 128), and a unit hierarchy 130. Data store 112 can include a wide variety of other information 132 as well. Application component 116 accesses the information in data store 112 in implementing programs, workflows, or other operations performed by application component 116. By way of example, application component 116 accesses unit hierarchy 130 and operate on entities 126, metadata 120, or other records.

In the example shown in FIG. 1, computing system 102 illustratively includes processor(s) and/or server(s) 134, a display system 136 (which, itself, includes a user interface component 138 and one or more sensors 139, and it can include other items 140 as well), a property creation and configuration system 142, and a property surfacing system 144. Sensor(s) 139 are configured to detect inputs to display system 136. In one example, system 142 and/or system 144 also include sensors configured to detect inputs to those systems. Computing system 102 can include other items 147 as well.

In one example, processor(s) and/or server(s) 134 comprises a computer processor with associated memory and timing circuitry (not shown). The computer processor is a functional part of system 102 and is activated by, and facilitates the functionality of, other systems, components and items in computing system 102.

FIG. 1 shows a variety of different functional blocks. It will be noted that the blocks can be consolidated so that more functionality is performed by each block, or they can be divided so that they functionality is further distributed. It should also be noted that data store 112 can be any of a wide variety of different types of data stores. Further, data store 112 can be stored in multiple data stores. Also, the data stores can be local to the environments, agents, modules, and/or components that access them, or they can be remote therefrom and accessible by those environments, agents, modules, and/or components. Similarly, some can be local while others are remote.

Entities 126 can, in one example, represent units or physical items, or other items within computing system 102. For example, but not by limitation, a unit can represent a product, a service, a product category, a service category, a user, a directory, a territory, or other item.

When an organization that uses computing system 102 manufactures or sells products, then entities 126 can represent the products. The properties in property store 128 can illustratively represent physical (or other) characteristics of the products. In one example, if a particular entity 126 represents a washing machine, then the properties (which can also be defined in metadata 120) represent the color of the washing machine, the size of the washing machine, the weight of the washing machine, among a whole host of other physical characteristics of the product. In another example, if a particular entity 126 represents a tablet computer, then the properties represent the color of the tablet computer, the software installed on the tablet computer, the battery size, the screen size, and/or other physical characteristics of the tablet computer. Of course, where the entity 126 represents a different unit, then the properties illustratively represent the characteristics of that particular unit.

For the sake of the present discussion, but not by limitation, some embodiments will be described in the context of units representing physical products and/or product categories. However, as mentioned above, a unit can represent other types of items as well.

User 108 or other computing system(s) 110 may wish to obtain access to entities 126, and the corresponding properties (or attributes) from property store 128, for a variety of different applications or contexts. For instance, when another computing system 110 is an inventory system, then it may wish to obtain the entities 126 and properties in the context of an inventory system. When user 108 is a sales user, then user 108 may wish to obtain access to entities 126 and the corresponding properties, in a sales context. When user 108 or other computing system 110 is a manufacturing user or system, then that particular user or system may wish to access entities 126 and corresponding properties in property store 128, in the context of manufacturing.

In one example, a property models a single product configuration unit, and includes attributes such as, but not limited to, a unique identifier for identifying the property within computing system 102, a user friendly name, a definition of the allowed data type(s), a state code, a default value, and/or type dependent attributes (e.g., property value ranges and/or precision).

For sake of illustration, defining a property can be, in one example, similar to creating user-defined types with a constraint that it can contain only one member inside it and what are the allowed values for the member. This user defined type or property can then be contained inside a class to store what state it needs for performing its operation during execution. This class definition is used at runtime to create an object of this type. In a business system, for example, a runtime entity can include an opportunity entity which holds a unit (e.g., a product) with specific value(s) for each configuration property. In this manner, once a property has been defined to represent a specific configuration value, it can be used by a runtime entity to represent that value.

Unit hierarchy 130 illustratively represents a hierarchy of the various units and/or unit categories (or families) represented in computing system 102, for the purposes of organizing them. By way of example, units having common attributes can be categorized or grouped into a unit category (or family). For instance, unit hierarchy 130 may represent electronic units under a hierarchy, such as the one below:

Electronics→Computers→Tablet Computers→Brand X Tablet Computers→Brand X, Model Y, Tablet Computers . . . .

It can thus be seen that the nodes to the left in the above hierarchy are ancestor nodes to those on the right. The nodes to the right are descendent nodes relative to the nodes on the left.

Figure 2:
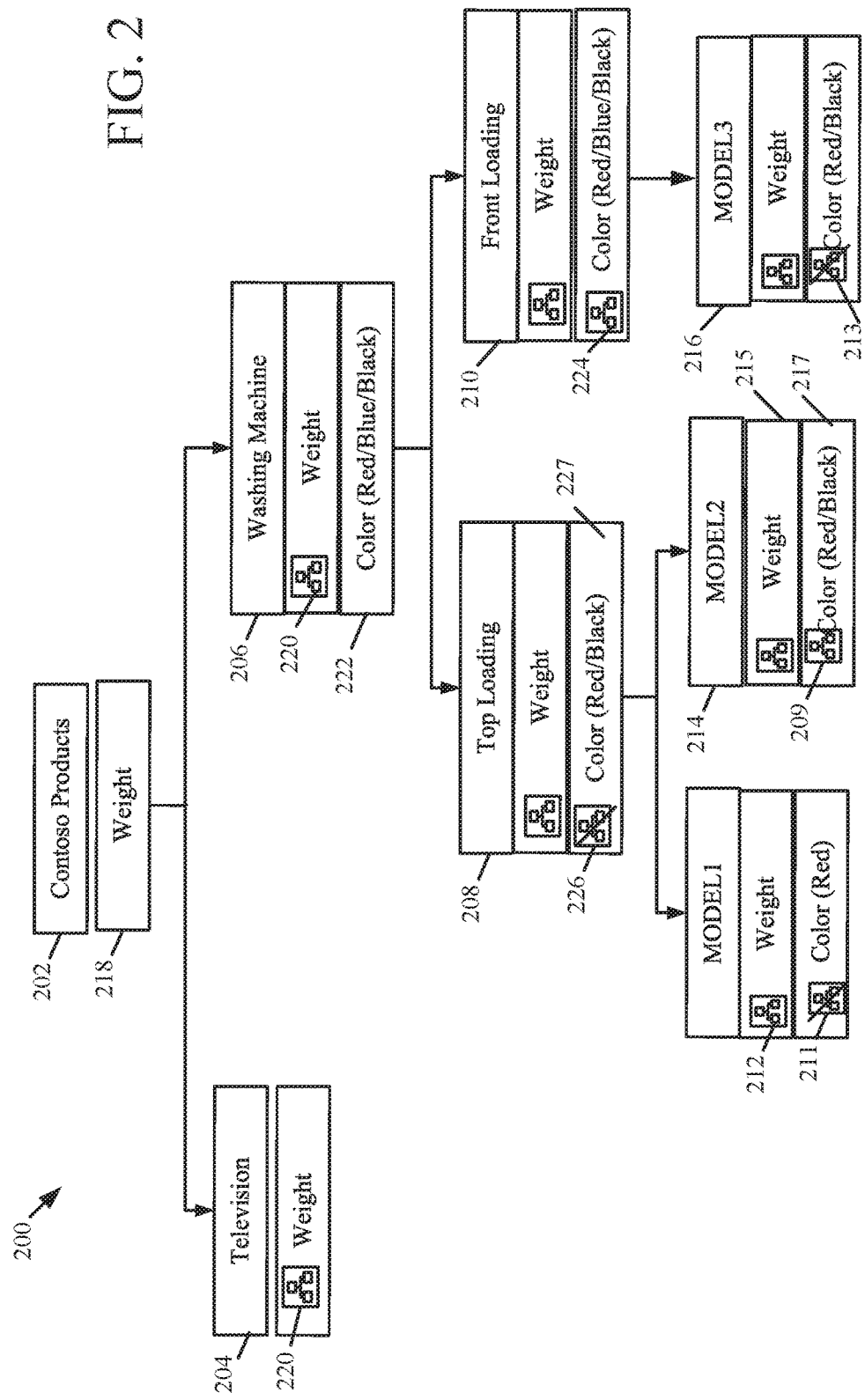
FIG. 2 illustrates one example of a unit hierarchy.

FIG. 2 illustrates another example of a unit hierarchy 200. As shown in FIG. 2, a root node 202 represents a root unit category (i.e., "Contoso Products"), and is a parent or ancestor node to nodes 204 and 206 which represent unit sub-category (i.e., televisions and washing machines, respectively). Further, node 206 is a parent or ancestor node to nodes 208 and 210 which represent unit sub-categories (i.e., top loading washing machines and front loading washing machines, respectively). Node 208 is a parent or ancestor node to leaf nodes 212 and 214 which represent particular products (i.e., "model1" and "model2", respectively, which are specific top loading washing machine models). Similarly, node 216 is a parent or ancestor node to leaf node 216 which represents a particular product (i.e., "model3", which is a front loading washing machine model).

FIG. 2 is by way of example only. In an example where computing system 102 is used by a relatively large organization, such as an enterprise organization, computing system 102 may have thousands of different unit hierarchies to classify all of the various products and/or services of the organization.

In such an organization, an efficient user experience (such as a salesperson experience) in accessing products and/or services, and their properties, is an important aspect. While selling, for example, a salesperson needs to be aware of the products and/or services that the organization sells. For the salesperson to be effective and efficient, it is important that all relevant information related to the product or service is available quickly and in an easy to consume format.

For sake of the present discussion, consider an organization which sells one hundred different products where each product can be uniquely configured in ten different ways based on their specification. Without having a way to reuse these attributes, the system needs to define one thousand attributes on the product entity. Further, if the organization uses a unit hierarchy, such as a catalog that hierarchically organizes products, these attributes are created at each node in the hierarchy. If the attributes of one product line are not segregated from the attributes of another product line, the salesperson will have to deal with unrelated attributes on each product. For instance, a salesperson selling a television will have to deal with a television form containing options applicable to cameras, fridge, washing machines, etc.

In defining the attributes at the categories in the catalog, the attributes are inferred down the hierarchy to reach the leaf nodes which represent the particular units (e.g., a product, a service, a product or service bundle). In this model, to figure out all attributes available at any level (such as during product catalog browsing and/or a sales transaction), the system needs to traverse the complete ancestral hierarchy and consider various actions (such as property override, hide operations, etc.) applied to each of these attributes at the different levels. This can be time consuming both with respect to database access and logic to determine which properties to surface.

In accordance with illustrated examples, property creation and configuration system 142 facilitates dynamically modeling and defining various types of unit properties in a unit hierarchy. For instance, system 142 provides the ability to default, inherit, and/or override properties at any level of the unit category association hierarchy. As discussed in further detail below, the unit properties are represented, in one example, using property entities and unit-property association entities that are dynamically created and maintained. These properties and their associations are dynamic in that they are modifiable as the unit properties change, for example with new versions of a product, and the property entities can be associated with any number of different units. In this manner, the property entities and attributes they represent can be reused across numerous units in a hierarchy.

The unit-property associations are utilized in surfacing the properties at run-time, without having to traverse the hierarchy (which typically requires a complex database query) to identify the properties for a given unit. This can reduce the required computing time and bandwidth, and improve the user experience. Further, architecture 100 can reduce the required data storage space by separating the property definitions from the property instances.

Also, in one example, within computing system 102 new units and their classification hierarchy can be easily modeled without requiring entity customization work in computing system. Users can define and manage multiple unit versions without having to replicate the unit entities, and, using property associations with the units (along with the state of the associations), the units can be provided with dual states for unit versioning support. For instance, a given product can be modified by a sales manager or administrator while, at the same time, user 108 (e.g., a sales person) conducts a sales transaction for the given product. In this manner, a sales manager can prepare for the launch of a newer version of a product/service while the sales people continue to sell the existing version. Then, once the newer version of the product/service is available, architecture 100 provides capabilities to continue to service the previous version.

Referring again to FIG. 1, property creation and configuration system 142 allows user 106 to configure (such as add, delete, or modify) properties in property store 128 for entities 126. System 142 includes a unit creation component 146 for creating, managing, editing, and/or deleting units and unit categories. For example, using component 146, user 108 can define new units and new unit categories in unit hierarchy 130. With respect to the example of FIG. 2, user 108 can define a new sub-category under node 206, a new unit under node 210, etc. As such, component 146 can be utilized to create new units and unit categories, and to specify a location of the new units or unit categories within unit hierarchy 130. A hierarchy analyzing component 148 can be utilized to analyze the unit hierarchy 130 to identify a relationship between the units and unit categories.

System 142 includes a display system controller 150 configured to control display system 136 and user interface component 138 to generate various user interface displays 104 during the property creation and configuration process.

System 142 also includes a property inheritance component 152 that provides an inheritance model for the units and unit categories within hierarchy 130. In the illustrated example, property inheritance component 152 is configured to facilitate the inheritance of properties within unit hierarchy 130 such that descendant nodes within the hierarchy (which may represent sub-categories or specific units) inherit properties from the ancestor nodes. One example of property inheritance is illustrated in FIG. 2.

As shown in FIG. 2, the root node 202 includes a weight property 218 that is defined at the root level. Property 218 is inherited by its descendant nodes 204 and 206. The inherited properties are designated by an inheritance indicator 220. In one example, by default all properties are inherited and have visibility to all downstream descendant nodes. In this example, to prevent an inherited property from being visible at a descendant node, the property can be marked as hidden at the descendent node.

Indicator 220 indicates that the corresponding property is an inherited property, as opposed to an owned property that was added at the node. As shown in FIG. 2, a color property 222 has been added at, and is thus owned by, node 206. Color property 222 is inherited by node 210 (indicated by inheritance indicator 224). However, while node 208 has also inherited the color property 222, the color property 222 has been modified at node 208 to include a different option set (i.e., the blue color option has been removed). This is indicated by a modified inheritance indicator 226. The color property 227, as modified at node 208, is inherited by node 214 (indicated by inheritance indicator 209). Color property 227 is also inherited by node 212, but with a further modification (i.e., the black color option has been removed). This is indicated by a modified inheritance indicator 211.

Similarly, color property 222 is inherited by node 216, from node 210. However, in this example, color property 222 is modified at node 216 to include a different option set (i.e., the black color option only). This is indicated by a modified inheritance indicator 213.

Referring again to FIG. 1, system 142 includes a property entity creation component 154, a unit-property association entity creation component 156, a property instance creation component 158 and a unit versioning control system 160. System 142 can include other items 161 as well.

Component 154 is configured to create dynamic property entities that each represent a particular unit property. A property entity refers to and holds the actual property definition for the property. Unit-property association entity creation component 156 is configured to create unit-property association entities that associate the property entities created by component 154 with the units and unit categories.

Figure 3:
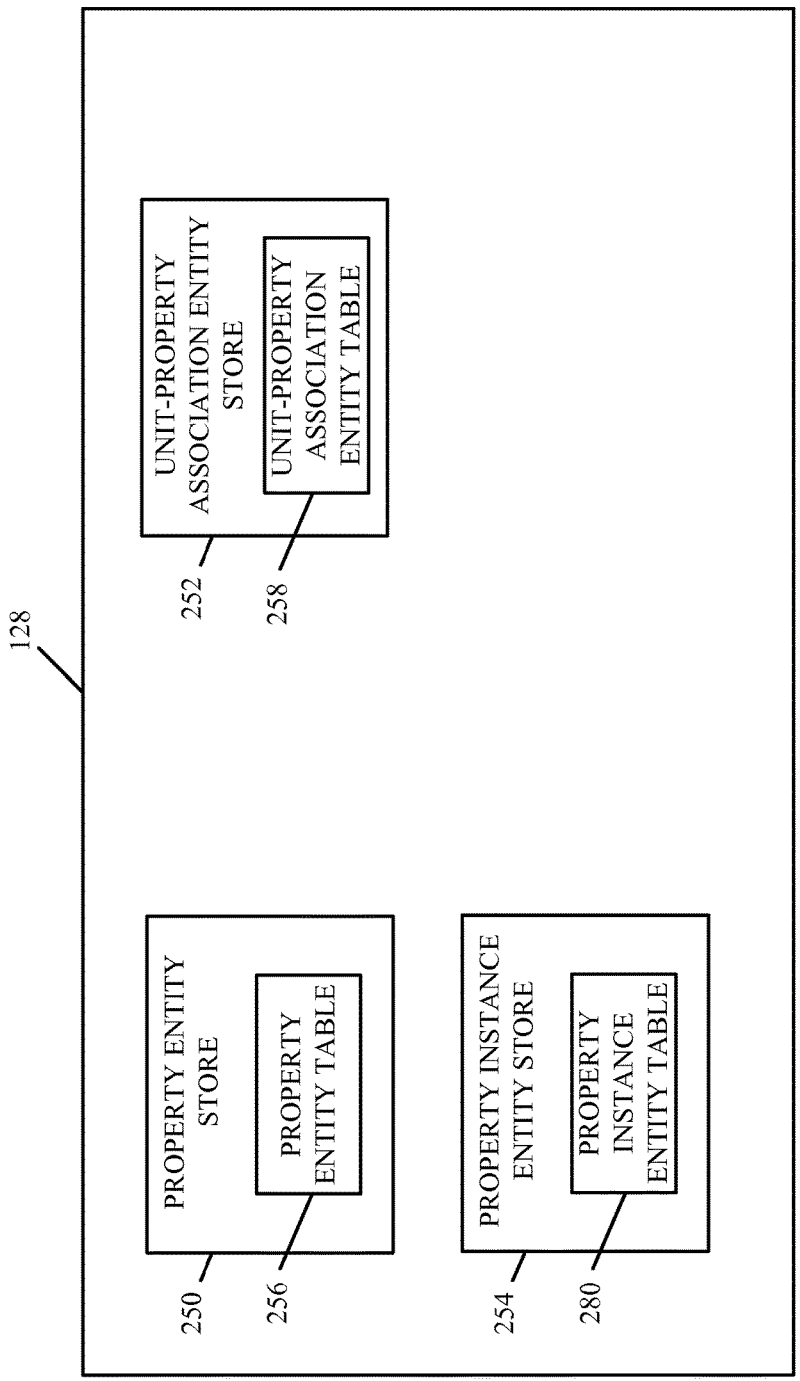
FIG. 3 is a block diagram of one example of a property store.

Property instance creation component 158 is configured to create property instance entities that represent the runtime instances of the properties. For example, at runtime, a transactional entity (such as a sales order entity, an opportunity entity, a quote entity, etc.) may be created to include a particular product having a set of properties. In this case, component 158 creates property instance entities that represent the set of properties, and their corresponding values entered for the properties, at the time the transactional entity was created. The property instance entity is, in one example, a snapshot of the unit properties at the time the runtime object is created. The entities created by components 154, 156, and 158 are stored, in one example, in property store 128. FIG. 3 illustrates one example of property store 128.

As shown in FIG. 3, property store 128 includes a property entity store 250, a unit-property association entity store 252, and a property instance entity store 254. In the illustrated example, each store 250, 252, and 254 comprises a respective table that stores the entities. For example, store 250 includes a property entity table 256 that stores each property entity as a record or row within table 256. Similarly, store 252 includes a unit-property association entity table 258 that stores each unit-property association entity as a record or row within table 258, and store 254 includes a property instance entity table 260 that stores each property instance entity as a record or row within table 260.

Figure 4:
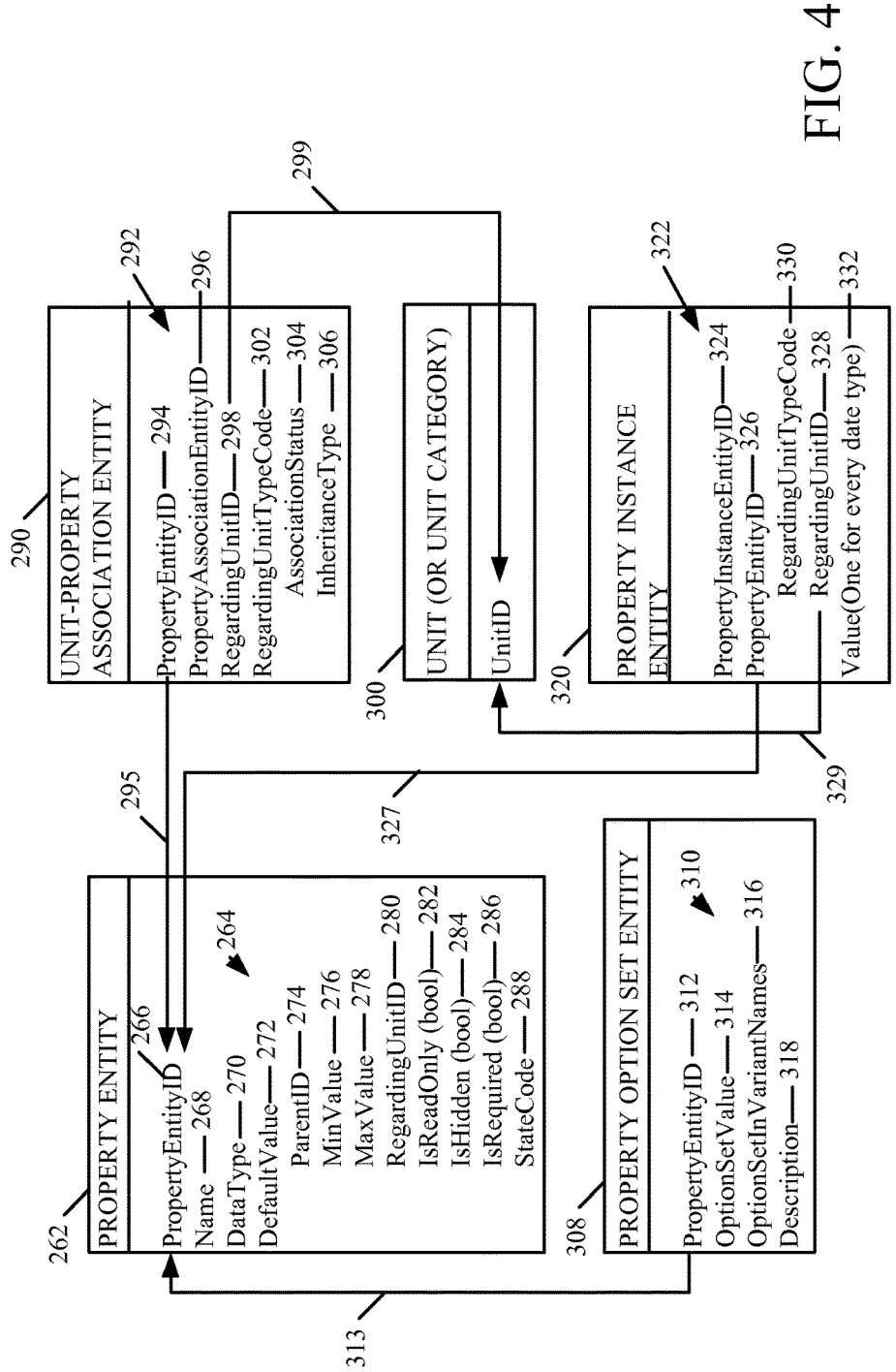
FIG. 4 illustrates one example of a property storage schema.

Before describing generation of the entities in further detail, one example of an entity storage schema will be discussed. As shown in FIG. 4, a property entity 262 represents a particular property and has a set of attributes 264. Property entity 262 thus defines metadata of the property.

In the example of FIG. 4, attributes 264 include a property entity identifier attribute 266 which uniquely identifies the property entity 262. In one example, attribute 266 comprises a primary key for property entity 262. Attributes 264 also can include, in one example, a name attribute 268 that stores a user friendly name for a user to easily identify the property, and a data type attribute 270. Examples of properties include, but are not limited to, product weight, product color, product operating voltage, memory size, etc. Examples of data type attribute 270 include, but are not limited to, decimal, string, integers, floating point numbers, option set, etc. These, of course, are examples only.

Attributes 264 can also include a default value attribute 272 that stores a default value of the property and a parent identifier attribute 274 that includes an identification of a parent property from which the property represented by entity 262 is a child property. By way of example, if a property is modified at a lower level in the hierarchy, entity 262 can be created to represent the property modifications. In this case, attribute 274 can contain an identifier or pointer to the parent property that was modified.

Attributes 264 can also include a minimum value attribute 276 and a maximum value attribute 278. Minimum value attribute 276 and maximum value attribute 278 define the minimum and maximum allowed values for the property, respectively. In one example, attributes 276 and 278 are applicable for only certain data types.

In the illustrated example, attributes 264 can also include a unit identifier attribute 280 that identifies a unit or unit category that owns the property. For instance, attribute 280 can identify the node within hierarchy 200 at which the property was added. Attributes 264 can also include a read only attribute 282, a hidden attribute 284, and a required attribute 286. These attributes indicate, respectively, whether the property is read only, hidden, and/or mandatory. In one example, if a property is hidden, it is not available at a lower level in the hierarchy.

Attributes 264 can also include a state code attribute 288 that indicates a state or status of the property. For example, the property can have an active status or an inactive status (e.g., draft, retired, etc.). Active and inactive statuses are discussed in further detail below. Briefly, however, a unit and its properties in an active state is available for operation in the runtime environment. In other words, in one example, a unit and its properties must be placed in an active state before they are visible and surfaced by property surfacing system 144.

Unit-property association entity 290 associates a property with a unit or unit category. Unit-property association entity 290 separates the definition of the property from the property's linkages to the units.

Entity 290 includes a set of attributes 292. In the illustrated example, attributes 292 include a property entity identification attribute 294 that identifies the property that is being associated to a unit, by entity 290. For example, attribute 294 comprises a pointer 295 (or other reference) to property entity 262. As such, attribute 294 links entity 290 to the corresponding property without having to store the entire property definition within the association entity table 258.

Attributes 292 also includes a property association entity identifier attribute 296 that uniquely identifies the association entity 290. For example, attribute 296 can comprise a primary key for entity 290. A unit identifier attribute 298 identifies the unit or unit category being associated to the property, by entity 290. For example, attribute 298 comprises a pointer 299 (or other reference) to a unit or unit category 300.

Attributes 292 can also include a unit type code attribute 302 that identifies the entity type code for the associated unit 300, an association status attribute 304, and an inheritance type attribute 306. Association status attribute 304 identifies whether the association is active or inactive (e.g., draft, retired, etc.). This is discussed in further detail below. The inheritance type attribute 306 identifies whether the associated property (represented by entity 262) is inherited by unit 300, owned by the unit 300, or is overridden for unit 300. Overriding a property is also discussed in further detail below.

If property entity 262 has an option set data type, then a property options set entity 308 can be utilized for holding various option set values for the property. Entity 308 includes a set of attributes 310 including a property entity identification attribute 312, an option set value attribute 314 that identifies the values of the option set, a name attribute 316, and a description attribute 318. Property entity identification attribute 312 comprises a pointer 313 (or other reference) to property entity 262.

In the illustrated example, property entity 262 comprises a template which holds the definition of the property. A property instance entity 320 is created to store the runtime data whenever the property is used (such as when adding a unit having the property to an opportunity, quote, order, or invoice, for example). For example, if unit 300 is added to an opportunity entity record, property instance creation component 158 creates instances of each property associated with unit 300. In this example, any changes to the definition of these properties thereafter does not affect these previously created property instance. The property instances capture the actual values for the property as chosen at runtime, which facilitates servicing the unit thereafter even though the property definition changes over time as per the organizational needs.

Entity 320 includes a set of attributes 322 including a property instance entity identification attribute 324 that uniquely identifies entity 320. For example, attribute 324 can comprise a primary key. A property entity identification attribute 326 identifies the property entity for which the property instance entity 320 has been created. For example, attribute 326 comprises a pointer 327 (or other reference) to property entity 262. Attributes 322 include a unit identification attribute 328 and a unit type code attribute 330. Attributes 328 and 330 identify the unit or unit category 300 for which entity 320 is created, and a type code for that unit. For example, attribute 328 comprises a pointer 329 (or other reference) to unit 300. A value attribute 332 stores or otherwise identifies the value(s) of the property in the runtime instance. That is, if a sales person sets a color property to a red value, value attribute 332 stores that information.

In accordance with one example, a property instance entity 320 is created for each property of the unit. For example, if a sales person adds the unit represented by node 214 in FIG. 2 to a sales order, a first property instance entity 320 is created for weight parameter 215 and a second property instance entity 320 is created for the color property 217. These property instance entities created for this unit form a snapshot of the properties for the unit at the time the runtime object is created. As such, if the properties at node 214 are modified to reflect an upgrade to the unit, the property instance entities previously created for the older unit version will still reflect the properties for the unit at the time the runtime object was created.

Unit versioning control system 160 includes a lifecycle management component 162 and a publishing component 164. Lifecycle management component 162 facilitates a dual or multiple states of the units and their properties. When a unit is being created or modified, it can be placed in an inactive (e.g., "draft") state. In this example, when in a draft state, the unit and its properties can be added, modified, and deleted by system 142, but are not surfaced by system 144 during runtime (i.e., when user 108 is performing a sales transaction). Thus, architecture 100 does not require that the unit is removed from the system while the unit is being upgraded or otherwise modified.

In one example, lifecycle management component 162 also allows the user to ignore or revert changes that were previously made to the unit properties. Further, a unit can be given a retired state when the unit is no longer available. If a unit is retired, it will no longer be visible for new opportunities, but the unit will still be available through property instance entities 320 for previous opportunities created prior to the unit being retired.

Once the unit has been configured with its property, the unit and its properties can be moved from the inactive, or draft state, to an active state. In one example, this is done by "publishing" the unit and its properties using publishing component 164. Publishing the unit and its properties means that the unit is considered active, and is available for surfacing by property surfacing system 144 in a runtime environment. A unit can be placed in an active state by publishing the entire unit hierarchy, or just a portion of the hierarchy that contains the unit. For example, in FIG. 2, user 108 can select to publish the entire hierarchy 200 (thus making all units and their properties active), or select a single node to be made active from the draft state. In one example, in order for a descendant node to be active, all of its ancestor nodes must also be active.

Once a unit is active, it is available for surfacing to user 108 during runtime. In this manner, user 108 can add the unit to transactional entities, such as opportunities, quotes, orders, etc. However, during this time, it may be that a new version of the unit is made available. In order to facilitate sales of the new unit version, the unit's properties may need to be modified by an administrator. To facilitate this, lifecycle management component 162 provides a dual state for the unit. In one example, component 162 maintains both an active version of the unit, for selling the current unit, and a draft version of the unit, for editing the properties to reflect the new unit. Once the draft version of the unit is published, the property changes are visible at runtime.

To illustrate one example, assume that an organization sells a first washing machine model (i.e., "Model2") represented by node 214 in FIG. 2 which is currently only available in a red and black colors. Thus, user 108 is able to select from the two available colors. At some point, the Model2 washing machine is made available in a yellow color. As such, a sales manager can modify property 217 to include yellow in the option set. During this modification process, the previous version of the unit remains in an active state, allowing user 108 to continue to sell Model2 with the red and block options. The modifications are placed in a draft state, such that they do not appear to user 108 until the sales manager publishes or activates the changes.

Figure 5A:
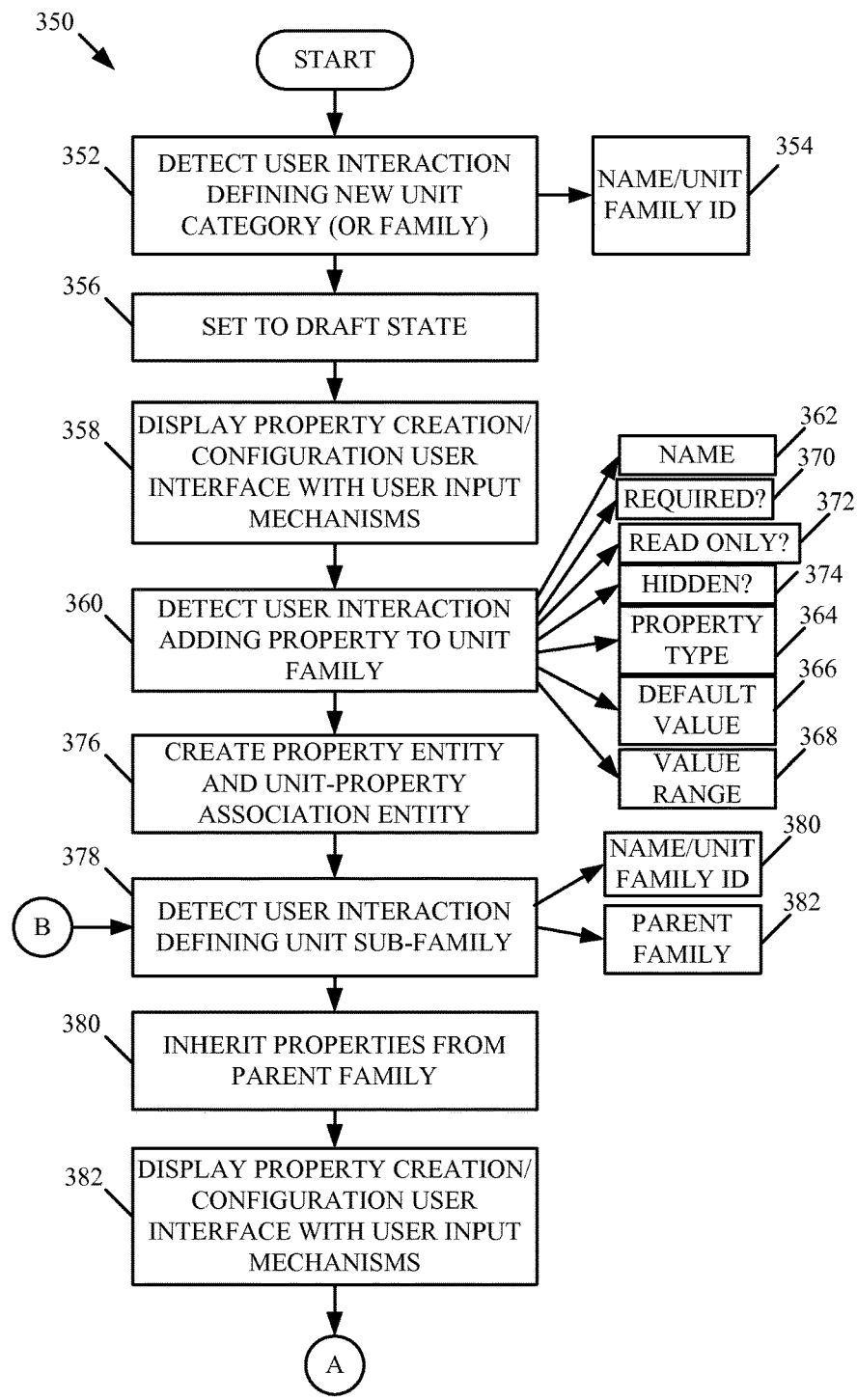
FIGS. 5A and 5B show a flow diagram of one example of a method for creating a unit hierarchy and defining properties within the hierarchy.
Figure 5B:
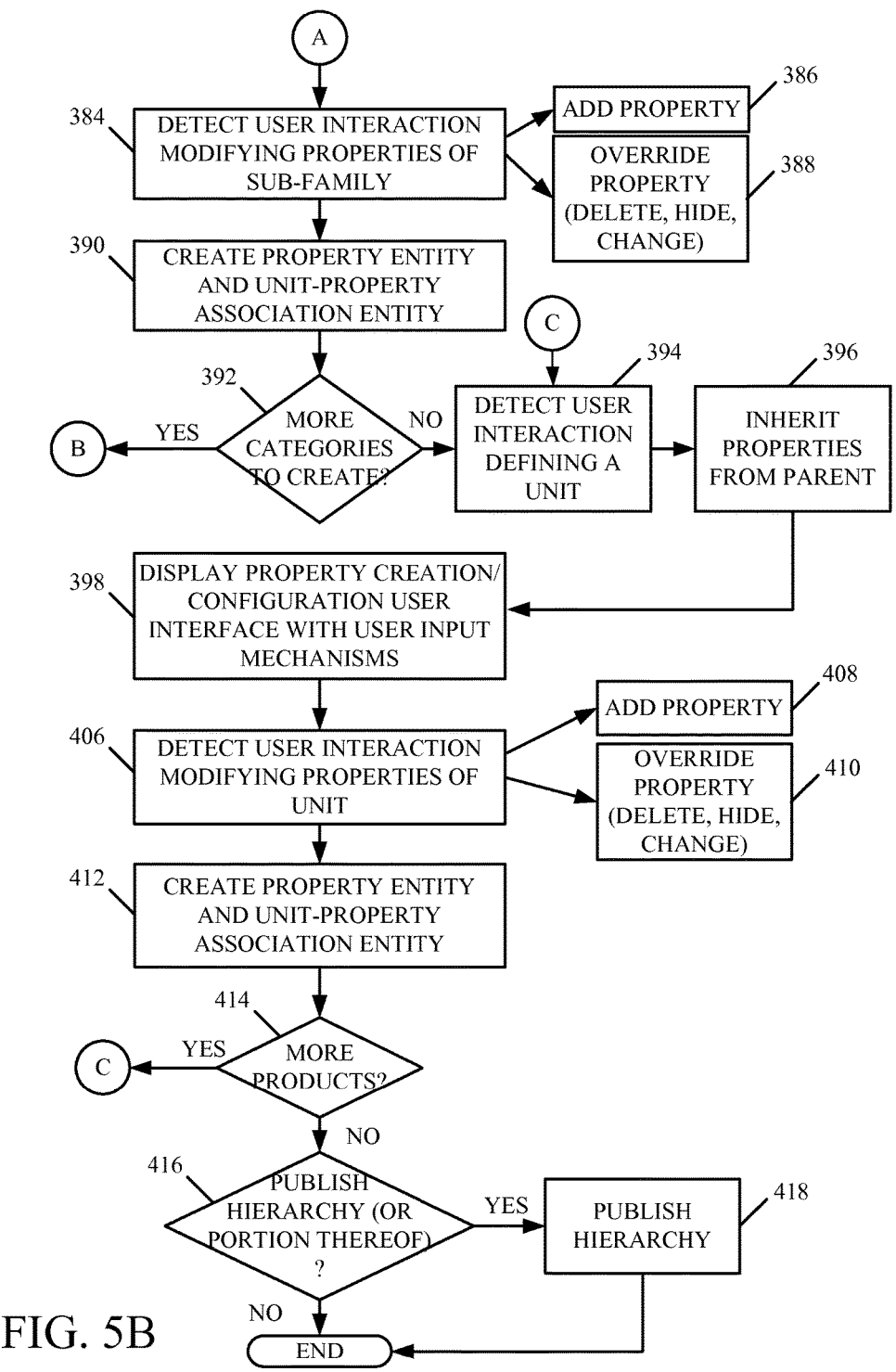

FIGS. 5A and 5B (collectively referred to as FIG. 5) provide a flow diagram of one example of a method 350 for creating a unit hierarchy and defining properties within the hierarchy. For the sake of illustration, but not by limitation, method 350 will be described in the context of using system 142 to create hierarchy 200, shown in FIG. 2.

Figure 6A:
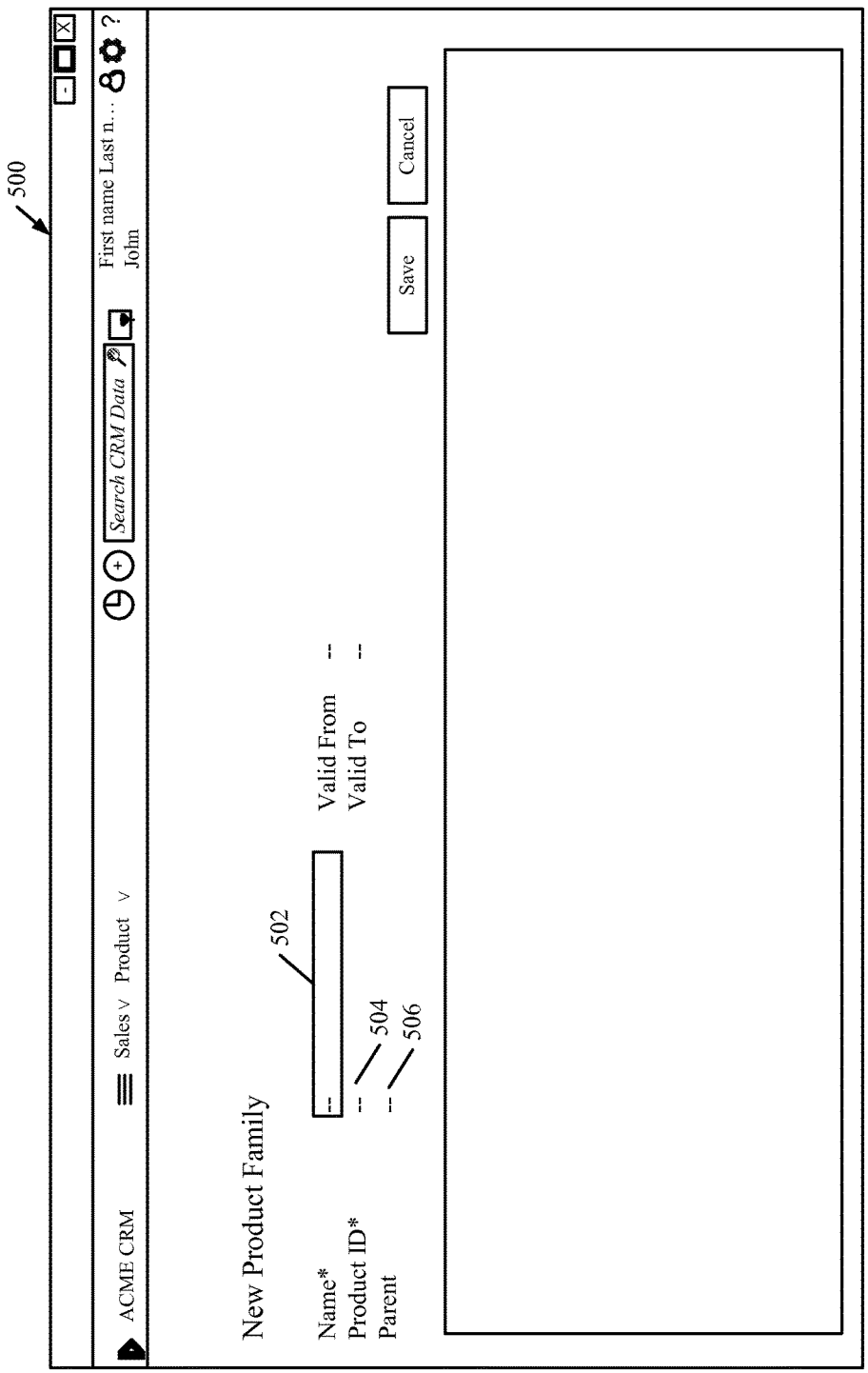
FIGS. 6A-6N show examples of user interface displays.

At step 352, a user interaction is detected that defines a new unit category (or family). In one example, this user interaction is detected through a user interface and includes name and product family identifiers received at block 354. FIG. 6A is a screenshot of one example of a user interface 500 through which a user defines a new unit family. User interface 500 includes a name field 502 for receiving a user friendly name for the product family and a product ID field 504 for identifying the product family within the unit hierarchy. A parent field 506 can be utilized to identify a parent family if the product family being created is a sub-family.

Figure 6B:
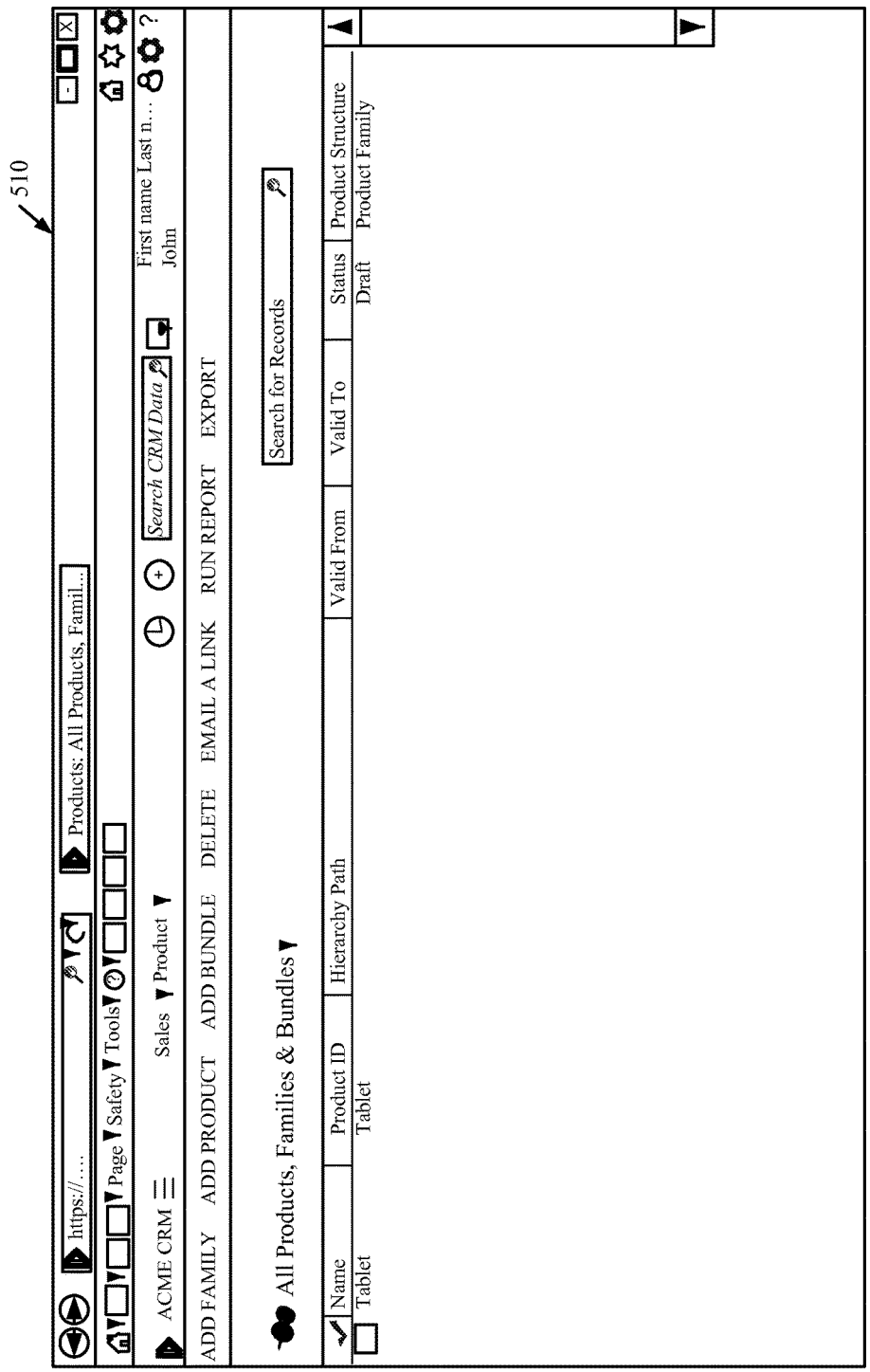

At step 356, the new product family is created by component 146 and is set to a draft state. FIG. 6B is a screenshot of a, example user interface 510 showing the newly created product family with a draft status.

Figure 6C:
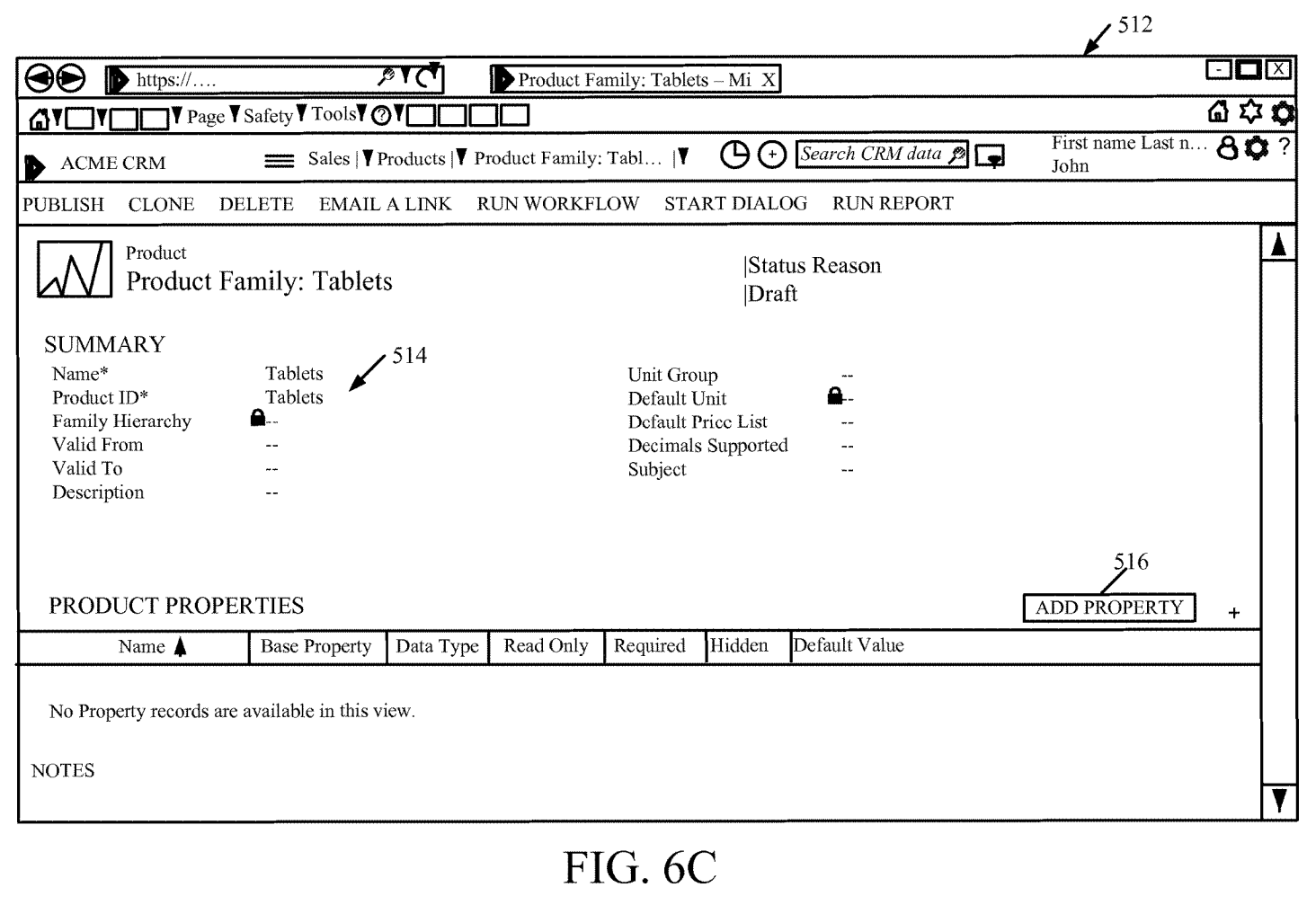

At step 358, a property creation/configuration user interface is displayed with user input mechanisms. One example of a property creation/configuration user interface 512 is illustrated in FIG. 6C. Interface 512 identifies the product family at reference number 514 and includes a user input mechanism 516 for adding a property to the property family.

At step 360, a user interaction is detected to add a property to the product family. For example, a user can actuate the add property button 516 upon which the user can define the attributes for the property. For example, the user can define a name 362 for the property, a property type 364, a default value 366, and/or a value range 368 for the property. Also, the user can define whether the property is required 370, read only 372, and/or hidden 374.

Figure 6D:
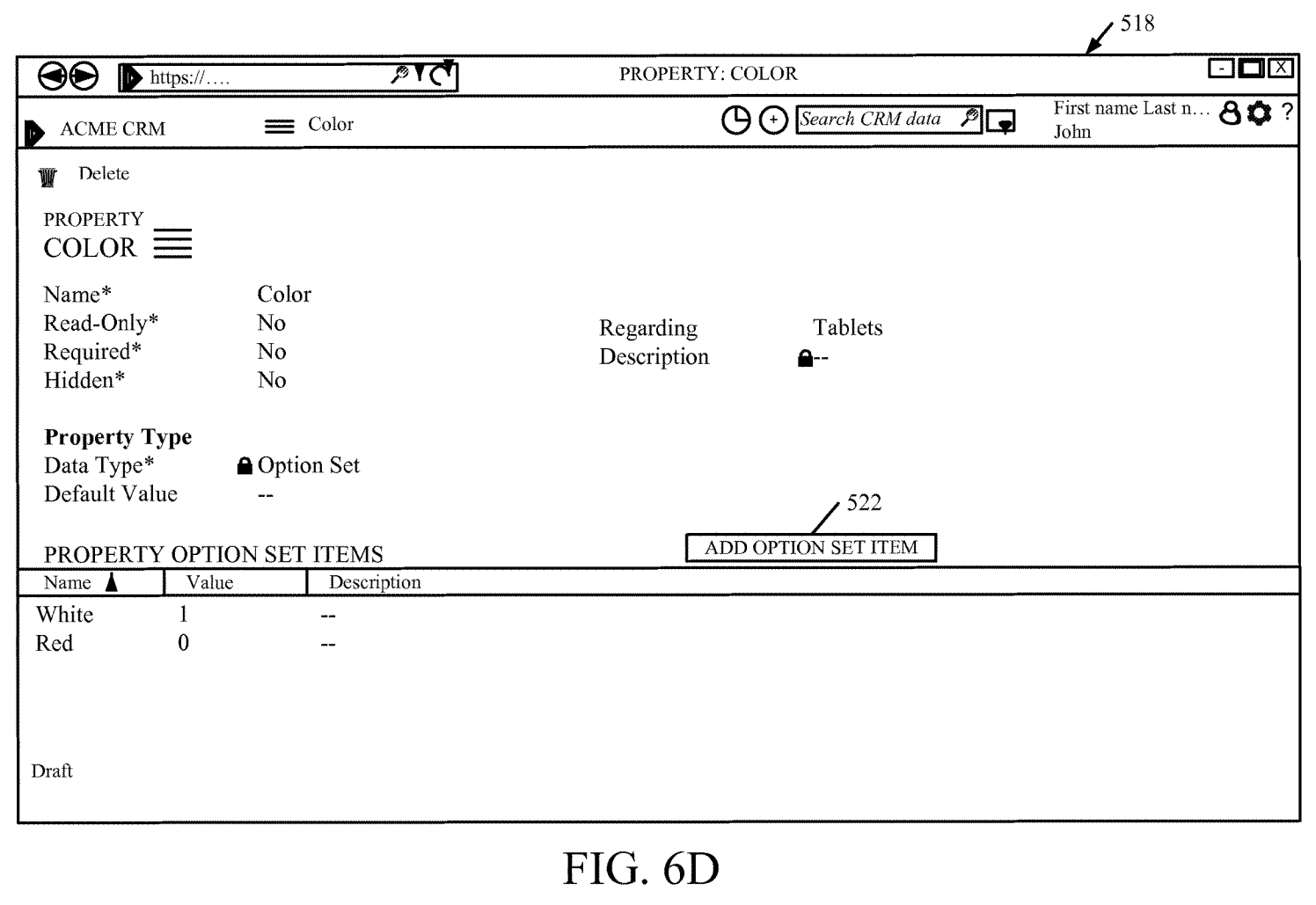
Figure 6E:

FIGS. 6D and 6E illustrate example user interfaces 518 and 520 that add color and memory properties, respectively, to the tablet family defined at step 352. User interface 518 includes a button 522 for adding an option set item to the property. In FIG. 6D, two option set items (i.e., white and red) are defined for the color property. User interface 520 includes a button 524 for adding an option set item to the memory property. In FIG. 6E, the memory property includes two option set items (i.e., "32 GB" and "16 GB").

FIG. 6F illustrates a user interface 526 that shows the properties defined for the tablet family at step 360. User interface 526 includes a button 528 that allows the user to add additional properties to the tablet family.

At step 376, the corresponding property entities and unit-property association entities are created. For example, property entity creation component 154 creates property entities for the color and memory properties, and stores these entities in property entity table 256. Unit-property association entity creation component 156 creates unit-property association entities that associate each of the property entities to the tablet family. These association entities can be stored in table 258. One example is shown in FIG. 7A.

Figure 6G:
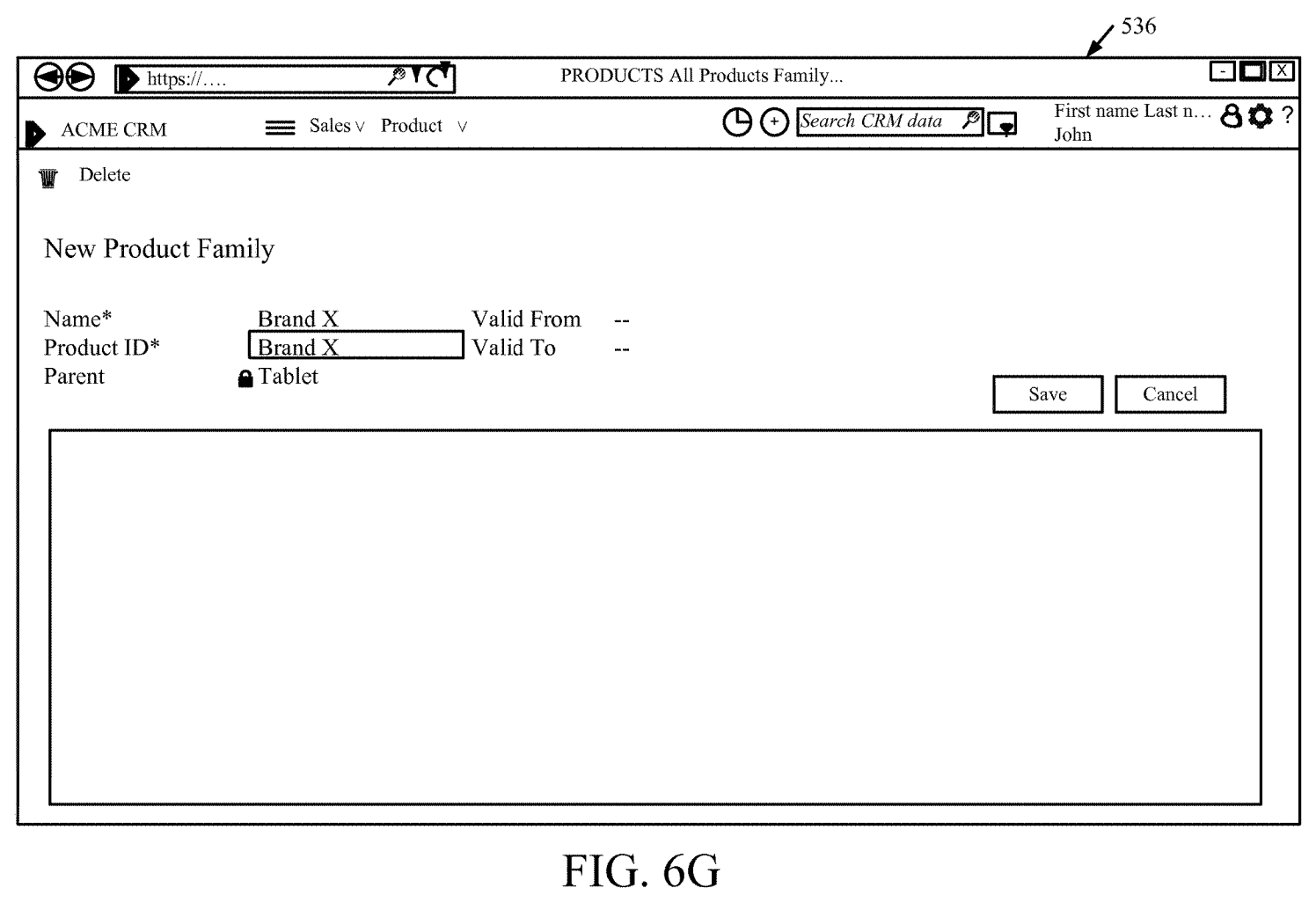
Figure 7A:
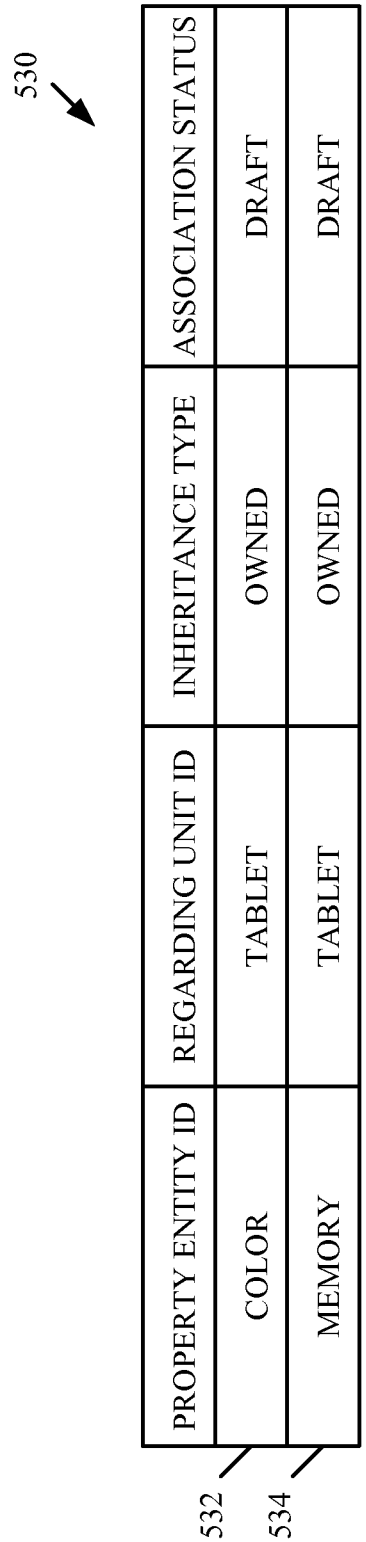

FIG. 7A illustrates an association entity table 530 having a first record 532 and a second record 534. Record 532 represents the color property that was added to the tablet category, and is thus owned by the tablet category. Record 534 similarly identifies the memory property that is associated with the tablet category. Both records 532 and 534 are marked as a draft status because they have not yet been published for runtime use. At step 378, a user interaction is detected that defines a product sub-family. This can include receiving a name and/or product family identification 380 and an identification of the parent family 382. FIG. 6G illustrates one example of a user interface 536 that receives a user input defining a sub-family (i.e., "Brand X") under the tablet parent category.

Figure 6H:
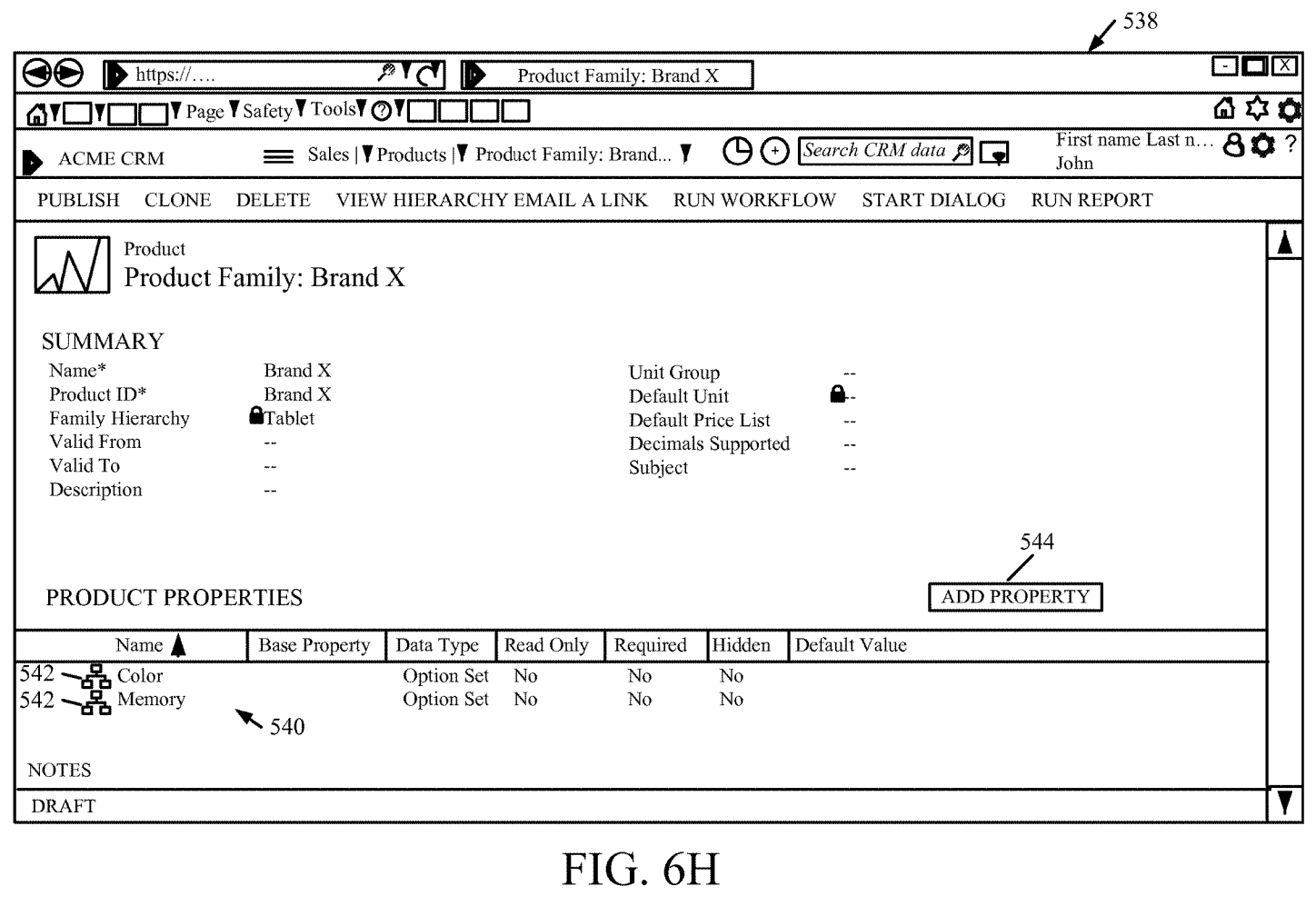

At step 380, the product sub-family inherits the properties from the parent family. A property creation/configuration user interface is displayed with user input mechanisms at step 382. FIG. 6H shows one example of a user interface 538 that displays the inherited properties 540 for the sub-family.

Specifically, the inherited properties 540 includes the color property and the memory property. Each of these properties are visually shown with an identifier or icon 542 that indicates that these properties have been inherited. User interface 538 includes a user input mechanism 544 for adding properties to the Brand X sub-family.

At step 384, a user interaction is detected that modifies properties of the sub-family. For example, this can include adding a new property at step 386 and/or overriding an inherited property at step 388. An inherited property can be overridden to delete, hide, or change the property, for example. In one example, in order to modify an inherited property, it must be first overridden so that the property does not inherit further down the hierarchy. When a property is overridden, a new property entity is created in the property entity table 256 with a link to the property that is being overridden (for example, using attribute 274 illustrated in FIG. 4). As such, different property conditions can be provided for different portions of the hierarchy and/or different product versions. When an overriding property is deleted, the parent property that was overridden is again inherited down the hierarchy.

Then, the newly created property entity linked to the parent property being overridden includes the appropriate attributes to form the property override. For example, to hide the property, the new property entity indicates that the new property entity is linked to the overridden property entity and includes an attribute that hides the property. Similarly, to change the property, the new property entity is linked to the overridden property entity and includes the new attributes (e.g., a new option set or default value, etc.).

Figure 6I:
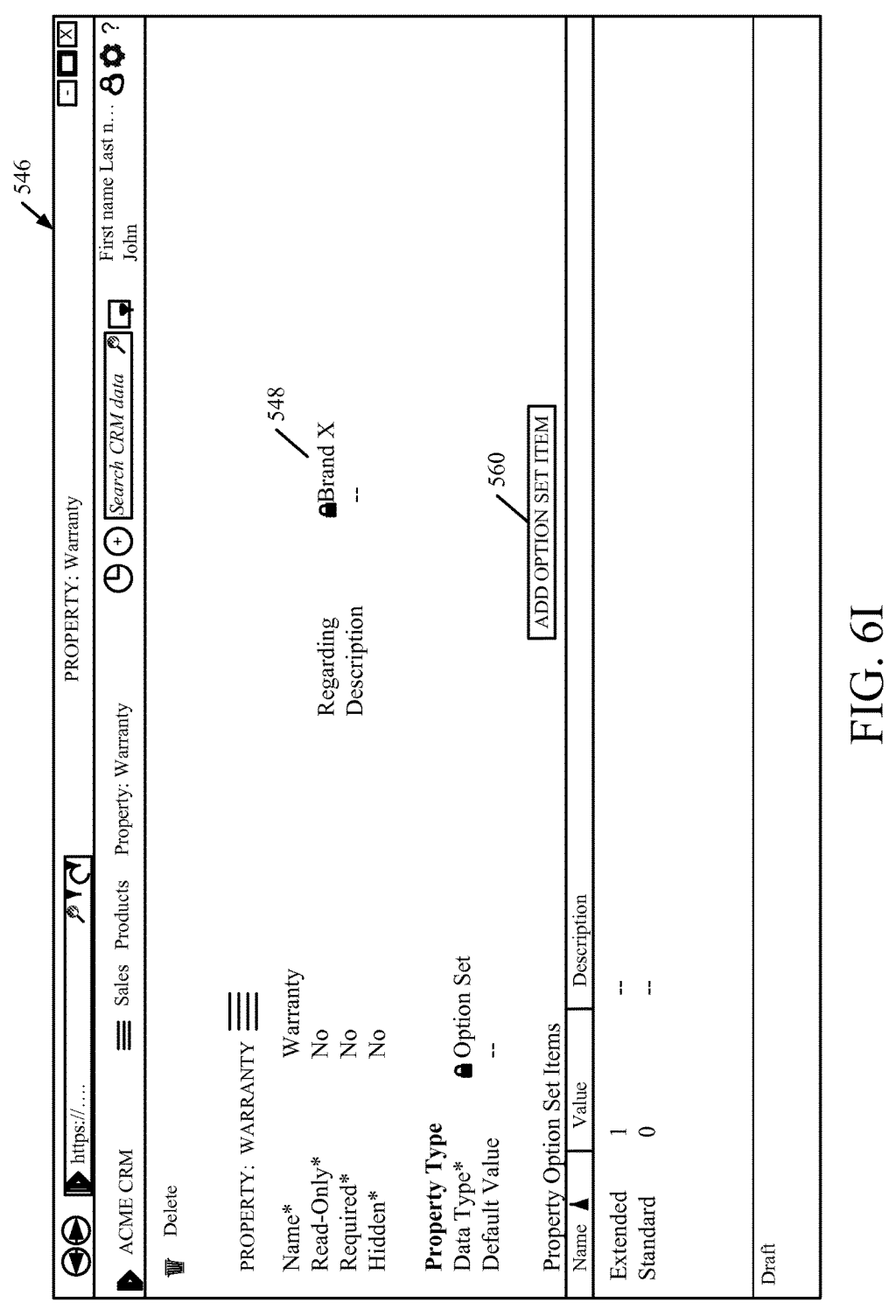

FIG. 6I shows one example of a user interface 546 in which a new property is added at step 386. As shown in FIG. 6I, the new warranty property identifies the sub-family 548 at which the property is being added and includes a user input mechanism 560 for adding the attributes of the property (an option set in the present example). FIG. 6J shows one example of a user interface 562 displaying the sub-family with the inherited properties 564 and the new property 566 was added to the sub-family.

Figure 7B:

At step 390, for each of the modifications, a property entity is created along with a unit-property association entity. FIG. 7B illustrates table 530 with a new association entity 568 for the warranty property added at step 386. Association entity 568 identifies the warranty property and that the warranty property is owned by the Brand X sub-family.

At step 392, it is determined whether there are any more categories or sub-categories to create. If not, the method proceeds to step 394 in which a user interaction defining a unit (e.g., a particular product) is detected. At step 396, the unit being defined inherits the properties from its parent. At step 398, a property configuration/configuration user interface is displayed with user input mechanisms.

Figure 6K:
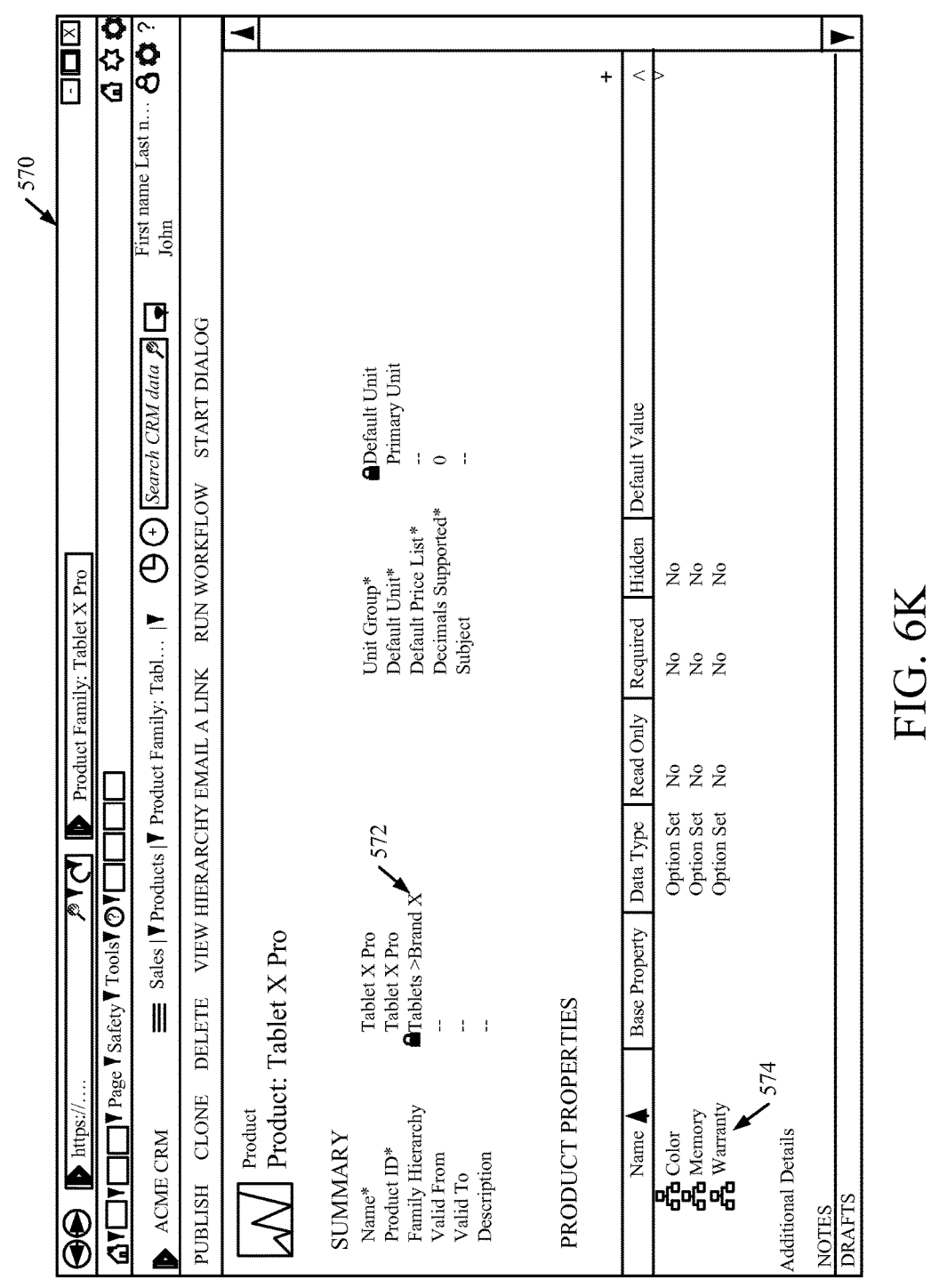

FIG. 6K shows one example of a user interface 570 for a new product (i.e., Tablet X Pro) that is a dependent node from the Brand X sub-family. This is represented at reference numeral 572. User interface 570 also shows the inherited properties 574.

At step 406, a user interaction is detected modifying properties of the product. For example, the user can add properties at step 408 or override a property, such as to delete, hide, or change an inherited property. FIG. 6L shows one example of a user interface 576 in which the user has selected an override operation for the memory property. Further, in overriding the memory property, the user has added an additional option set item (i.e., 64 GB) at reference numeral 578 and has defined a default value at reference numeral 580.

Figure 6M:
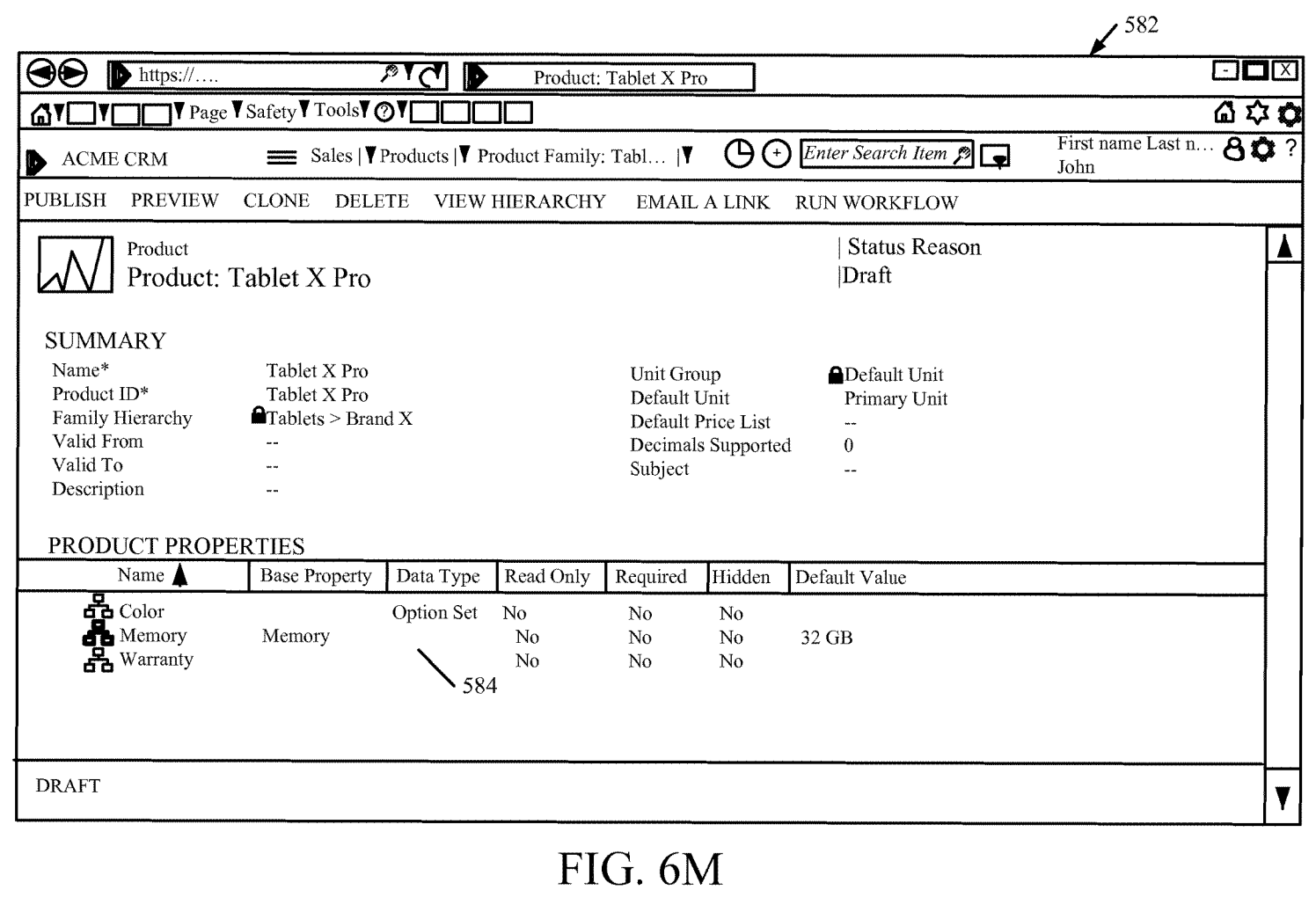

FIG. 6M shows one example of a user interface 582 showing the modified properties for the product. Specifically, user interface 582 identifies that the color and warranty properties have been inherited and that the memory property has been overridden. The memory property includes an entry that points to the base property 584.

Figure 7C:
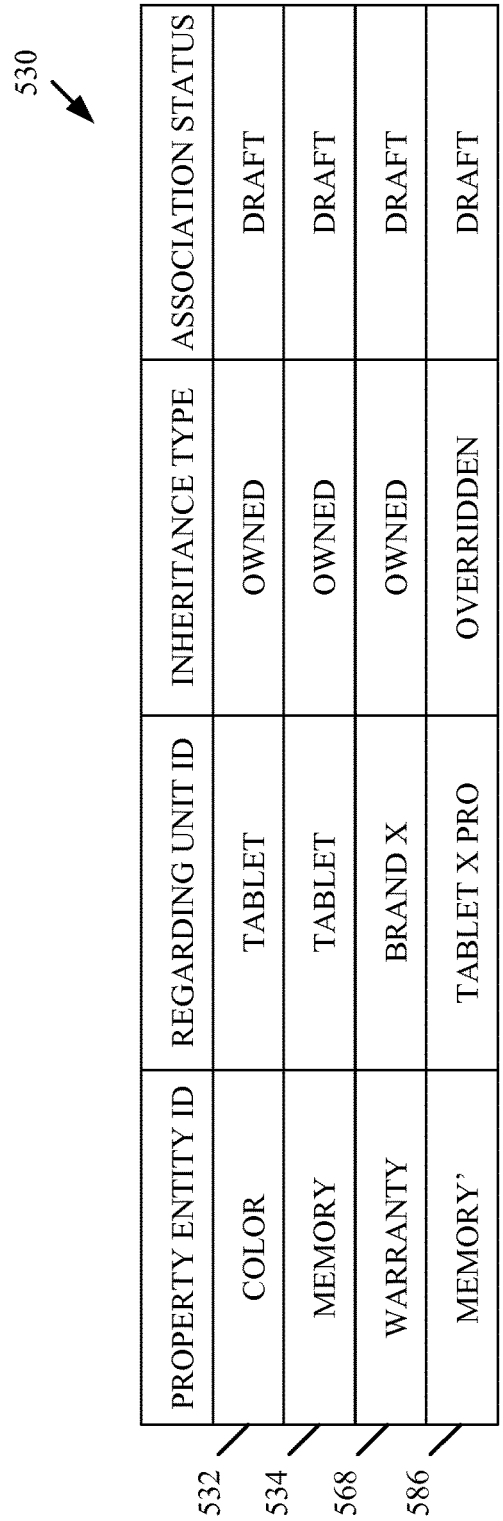

At step 412, for each modified property, a property entity and unit-property association entity is created. FIG. 7C illustrates table 530 with an association entity 586 representing the overridden memory property.

Figure 6N:
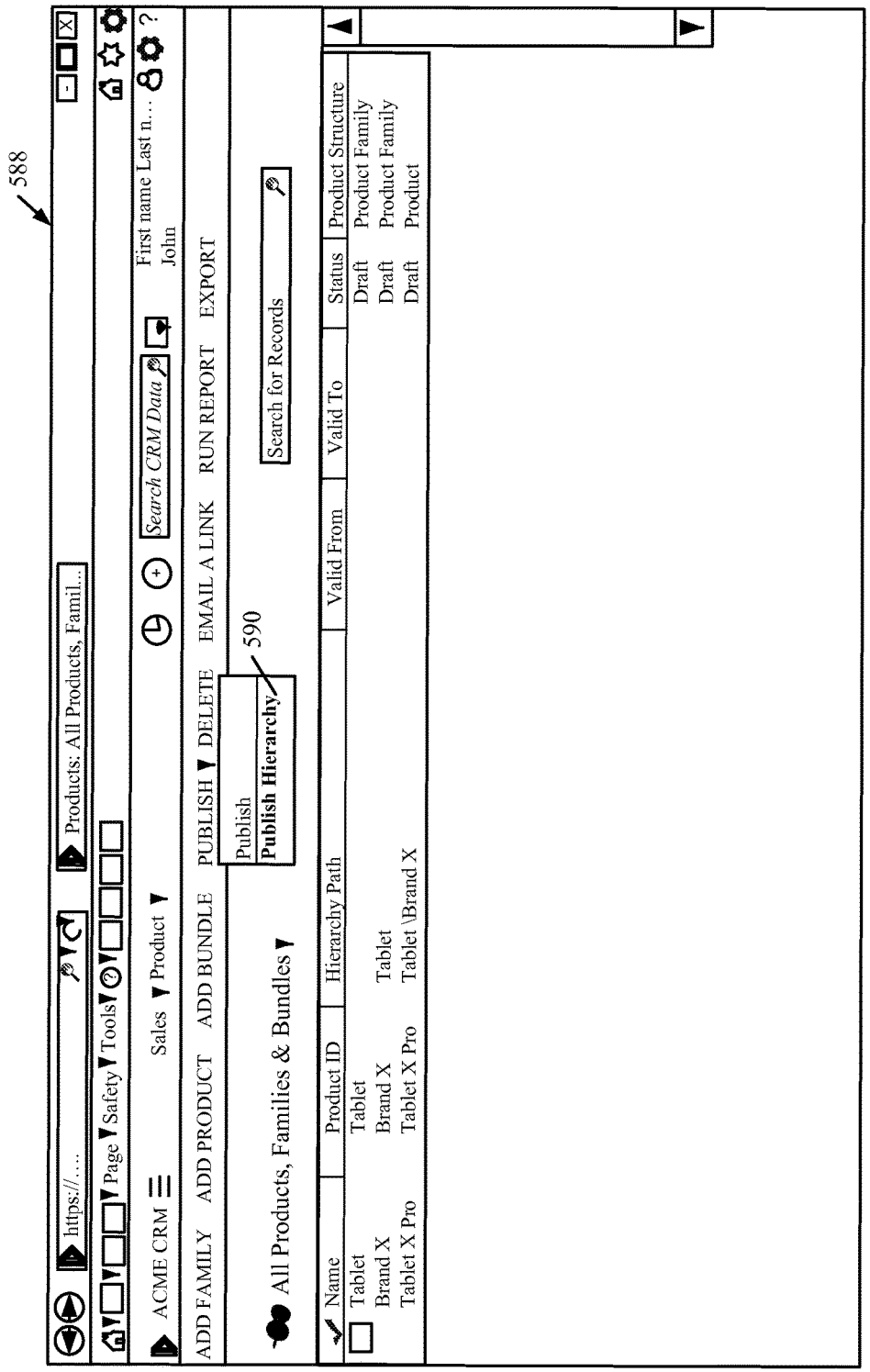

At step 414, the method determines whether there are any more products to add. If not, the method proceeds to step 416 to determine whether to publish the hierarchy, or a portion thereof. For example, the user can actuate a user input mechanism identifying that the user desired to publish the hierarchy. If so, the method proceeds to step 418 in which the hierarchy is published. FIG. 6N shows one example of a user interface 588 in which the user has selected a user input mechanism 590 to publish the hierarchy.

Figure 8:
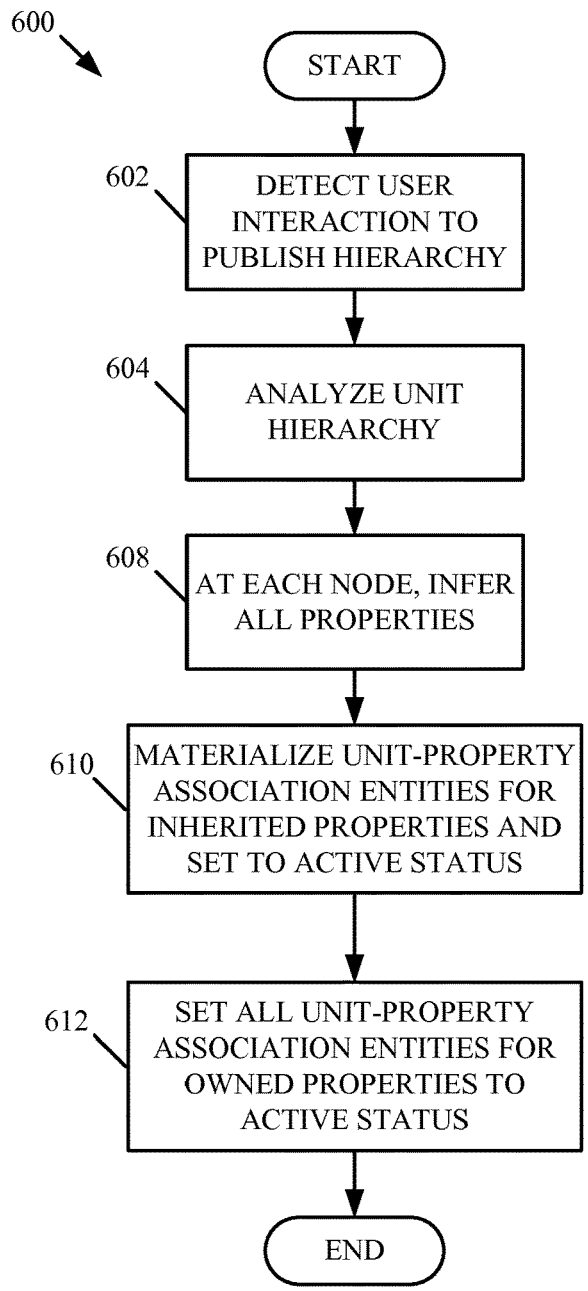
FIG. 8 is a flow diagram of one example of a method for publishing a hierarchy for runtime use.

FIG. 8 illustrates one example of a method 600 for publishing a hierarchy. For the sake of illustration, but not by limitation, method 600 will be described in the context of publishing the hierarchy defined in FIG. 5. At step 602, the method detects a user interaction to publish the hierarchy, or a portion thereof. For example, as discussed above with respect to FIG. 6N, the user actuates input mechanism 590 to publish the entire hierarchy. At step 604, the method analyzes the unit hierarchy to identify the hierarchical associations between the categories and units. For example, hierarchy analyzing component 148 determines that Brand X is a sub-family of the tablet family, and that Tablet X Pro is a product within the Brand X sub-family.

At step 608, at each node in the hierarchy the properties are inferred from the hierarchical relationships. At step 610, the unit-property association entities are materialized for the inherited properties and those entities are set to active status. At step 612, for all of the unit-property association entities for owned properties, the status is also set to active. In one example, FIG. 7D illustrates table 530 after the entities for the inherited properties have been materialized and set to active status.

Referring again to FIG. 1, property surfacing system 144 is configured to surface properties during runtime and control display system 136 and user interface component 138 in generating displays representative of those properties. As shown in FIG. 1, system 144 includes a display system controller 166 configured to control display system 136. System 144 also includes a unit identifier component 168, a unit-property association analyzer component 170, and a property analyzer component 172. System 144 can include other items 174 as well.

Unit identifier component 168 is configured to identify a particular unit, group of units, or unit category for which properties are to be surfaced. This can be in response to user input or workflows 122 and processes 124 performed within computing system 102, for example. Unit-property association analyzer component 170 is configured to analyze the unit-property association entities to identify the property entities associated with the identified unit, group of units, or unit category. Once a property entity has been identified, property analyzer component 172 obtains the property attributes and values by analyzing the corresponding property entities associated by the unit-property association entities.

In the illustrated example, component 170 includes a query generator 176 that generates a query against the unit-property association entity store 252. In one example, the query returns all association entities for a given unit that have an active state. As such, the query returns the association entities that have been published. The entities with a draft status (such as those entities that represent properties under revision) are not returned. This facilitates the dual unit state, discussed above. Further, queries can be generated and executed for a number of different units and properties without having to traverse unit hierarchy 130 at runtime.

Figure 9:
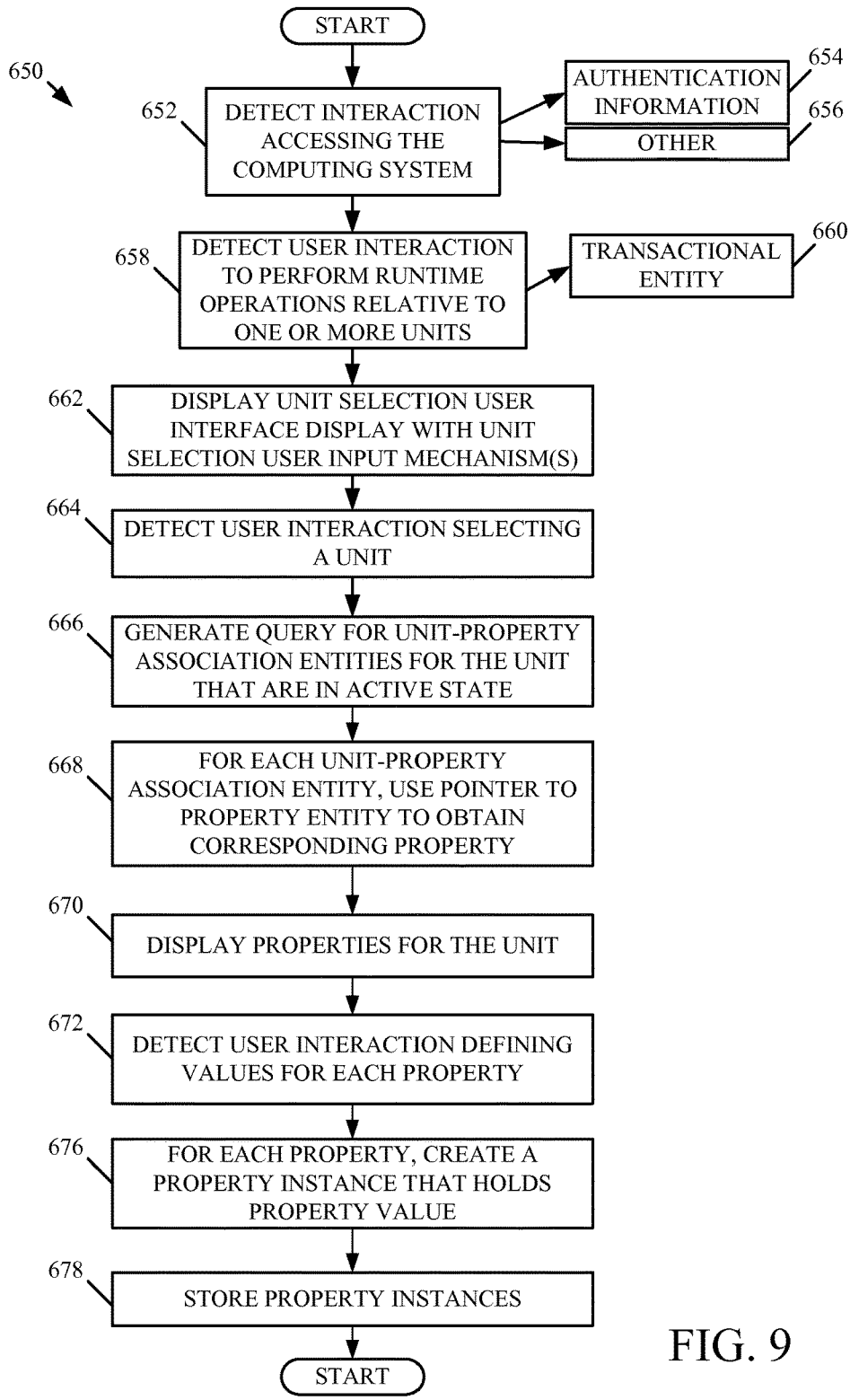
FIG. 9 is a flow diagram of one example of a method for surfacing properties during a runtime operation.

FIG. 9 is a flow diagram of one example of a method 650 for surfacing properties during runtime. For sake of illustration, but not by limitation, method 650 will be described in the context of property surfacing system 144 surfacing properties during runtime and controlling display system 136 in generating displays representative of those properties.

At step 652, system 144 detects a user interaction accessing computing system 102. For instance, user 108 or other computing systems 110 may provide authentication information 654. They may also provide interactions indicating that they wish to access properties from system 102 in other ways as well. This is indicated by block 656. In discussing method 650, it will be assumed that user 108 is interacting with system 102 to have properties surfaced. It will be noted, however, that this could just as easily be performed by other computing systems 110 (either in automated fashion through application programming interfaces or other interfaces to system 102, etc.).

At step 658, property surfacing system 144 detects a user interaction to perform a runtime operation relative to one or more units. For example, user 108 can indicate that they wish to create a transactional entity, such as an opportunity entity, a sales order entity, a quote entity, etc. Creating a transactional entity is represented at block 660.

At step 662, system 144 controls display system 136 to display a unit selection user interface display with user selection mechanisms. For instance, the display may allow user 108 to select a product (or other unit) and see the description of that product, along with its properties, etc. Display system 144 then detects a user interaction selecting a unit for display. This is indicated by block 664. Display system 144 then detects a user interaction indicating that the user is requesting that the properties for the selected unit be surfaced for interaction by the user.

At step 666, query generator 176 generates a query for unit-property association entities for the selected unit that are in an active state. By way of example, if the user selected the Tablet X Pro product illustrated in FIG. 7D, the query returns the color, warranty, and memory properties associated with that unit, using table 530.

At step 668, for each of the association entities returned at step 666, property analyzer component 172 uses the pointer to the property entity to obtain the corresponding property. The above example, component 172 accesses property entity table 256 (shown in FIG. 3) to obtain the attributes of the color, warranty, and memory properties.

Figure 10:
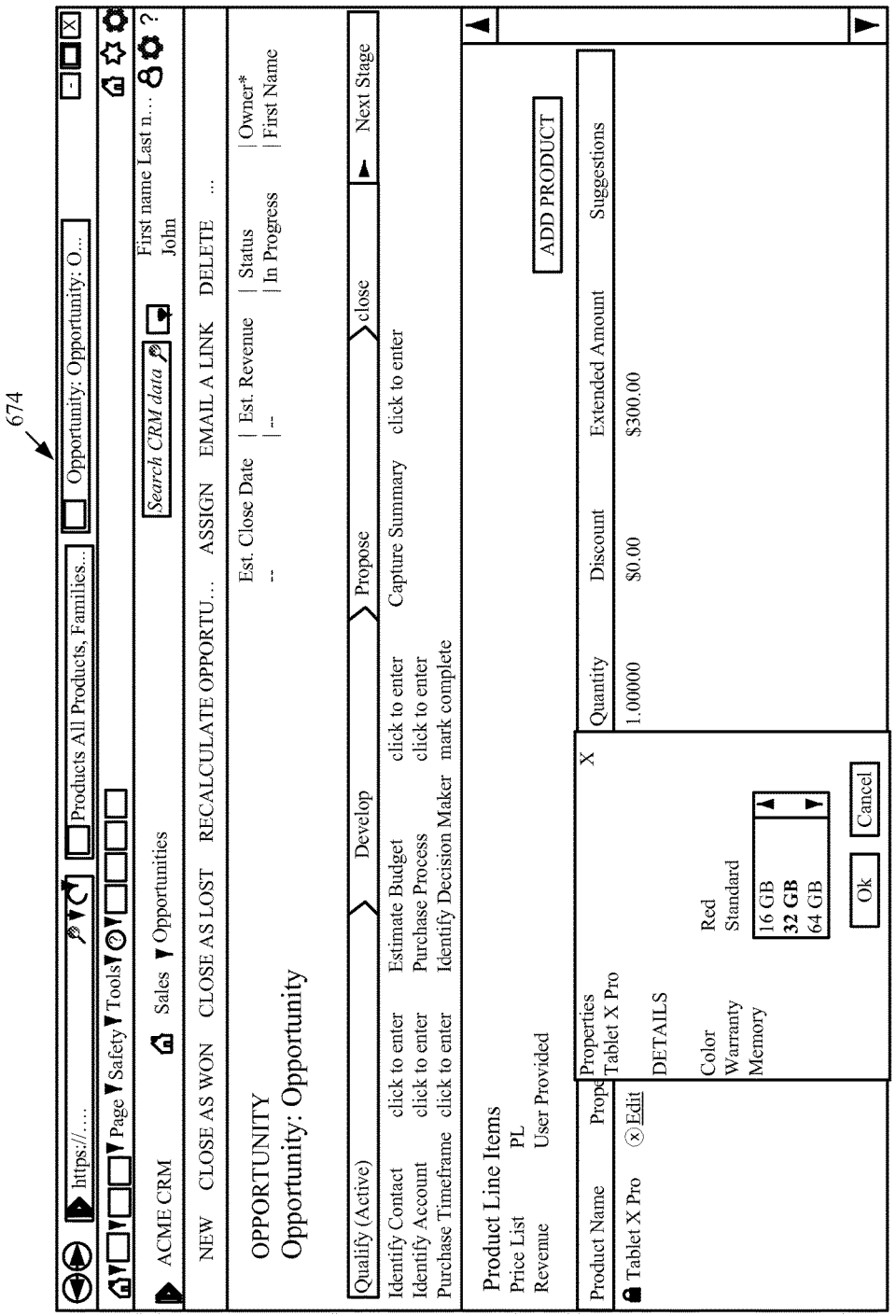
FIG. 10 shows one example of a user interface for displaying properties.

At step 670, the method detects a user interaction defining values for each of the properties. FIG. 10 shows one example of a user interface 674 displaying the properties for the Tablet X Pro unit and receiving user input defining values for each property.

At step 676, for each property, property instance creation component 158 creates a property instance that holds the property value. Those property instances are stored at step 678.

Figure 11:
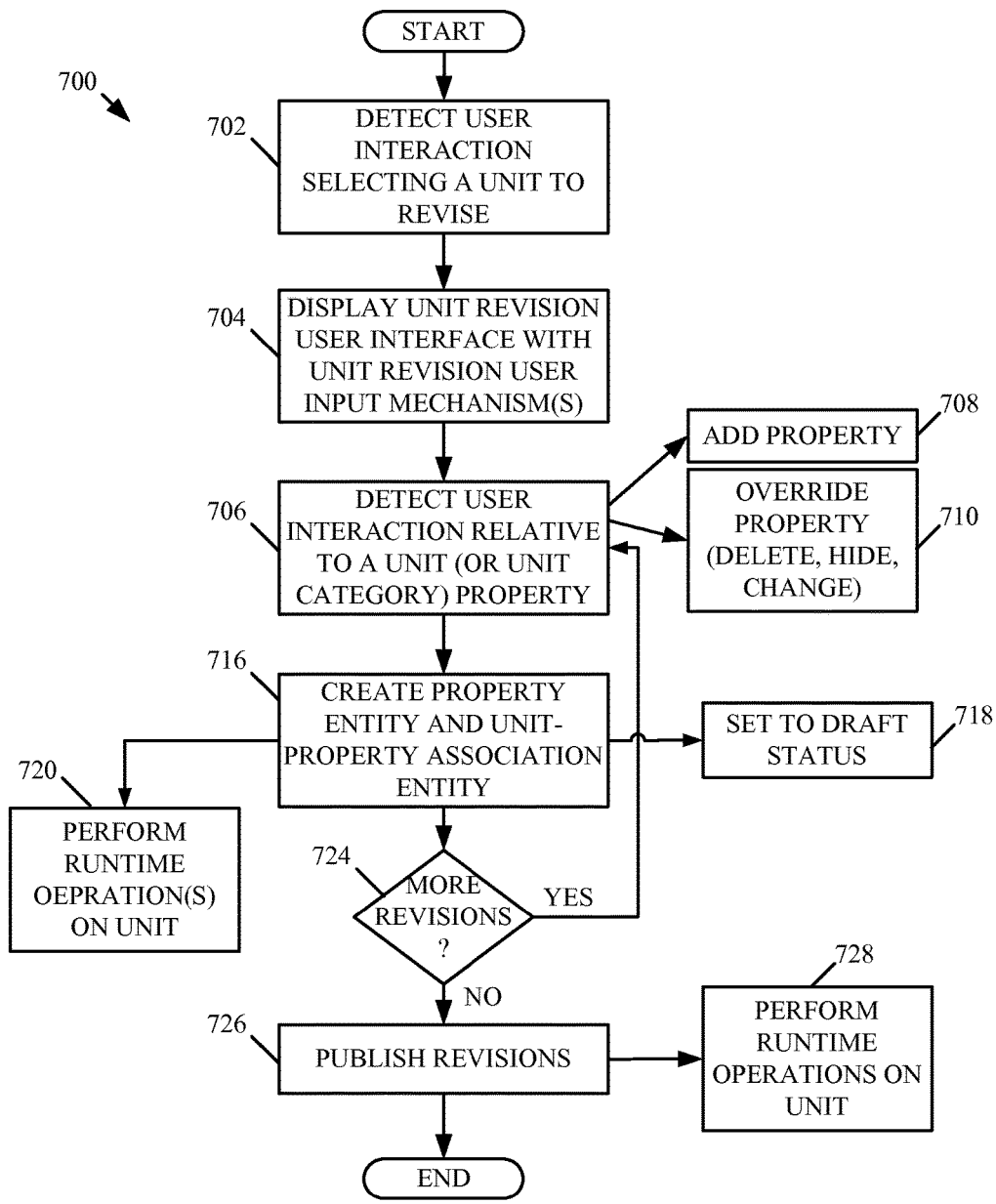
FIG. 11 is a flow diagram of one example of a method utilizing a dual unit state.

FIG. 11 is a flow diagram of one example of a method 700 utilizing a dual state of a unit. For sake of illustration, but not by limitation, method 700 will be described in the context of systems 142 and 144 shown in FIG. 1.

At step 702, the method detects a user interaction selecting a unit to revise. For sake of illustration, assume a user selected the Tablet X Pro unit shown in FIG. 7D.

At step 704, display system controller 150 controls display system 136 to display a unit revision user interface display. At step 706, a user interaction relative to a unit property is detected. For example, the user can add a property at block 708 or override a property at block 710. For the present example, the user selects the color property for the Tablet X Pro unit to change the property values. FIG.

12 illustrates an example user interface 712 showing that a user has added an option set item 714 (i.e., black) to the option set for the color property.

At step 716, a property entity is created for the revised color property. This property entity overrides the color property inherited from the unit's parent node. Also, a unit-property association entity is created associating this property entity to the Tablet X Pro unit. The entities are set to draft status at step 718.

Figure 12:
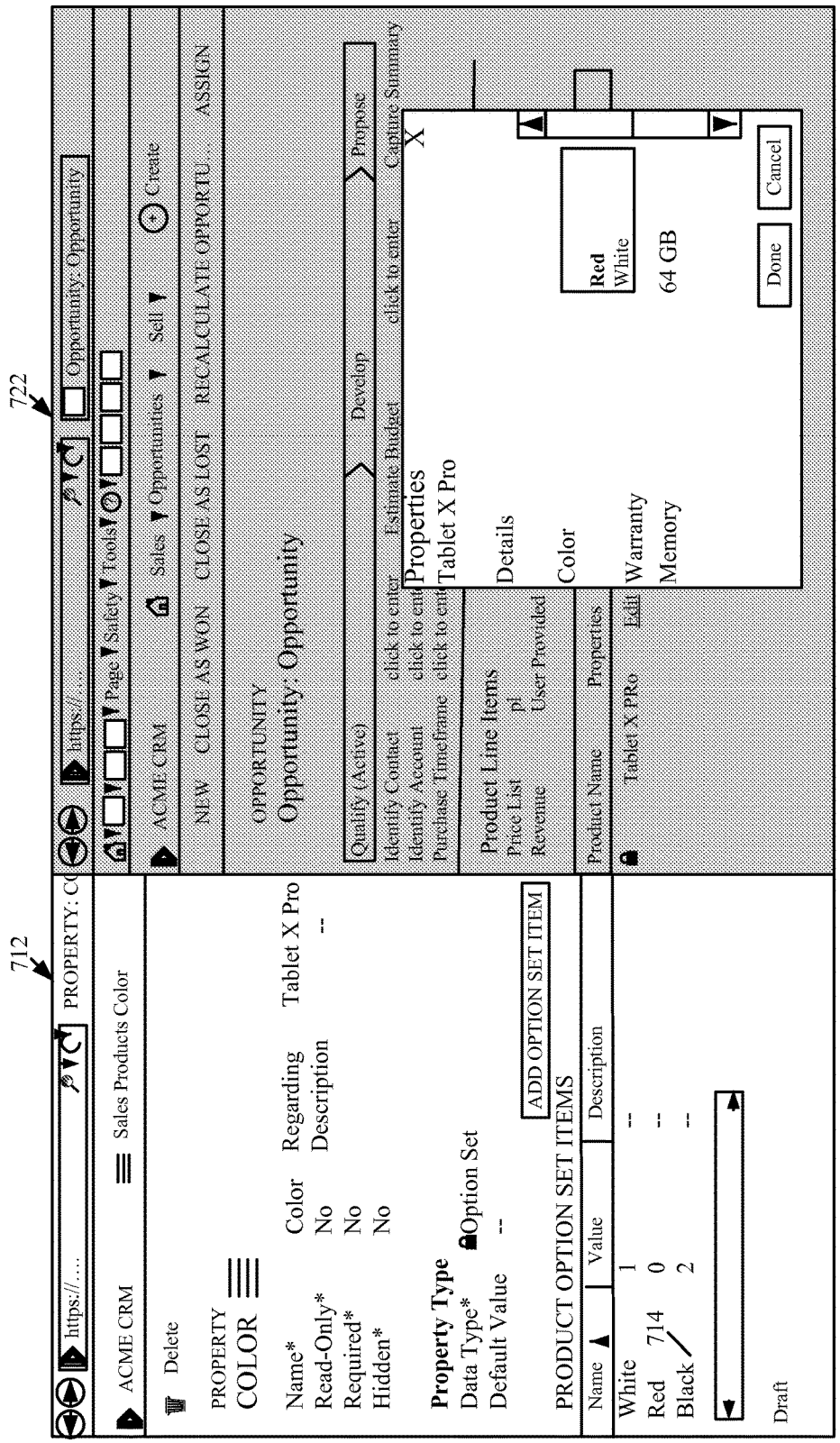
FIG. 12 shows example user interface displays showing a dual unit state.

While the properties for the unit are being modified, a runtime operation can be performed on the unit. This is indicated by block 720. For example, while a sales manager is editing the properties of the Tablet X Pro unit at step 716, a sales person performs a sales transaction relative to that unit at step 718. However, since the changes to the Tablet X Pro properties, made at step 706, have not yet been published, and are still in a draft state, the runtime operations will not display the revisions to the sales person. This is illustrated by user interface 722 shown in FIG. 12. Specifically, FIG. 12 shows a side-by-side comparison of user interfaces 712 and 722. As shown in user interface 722, the new option set item 714 does not appear as an option in user interface 722. In this manner, the Tablet X Pro unit has a dual state, that being an active state available at runtime and a draft state that is being modified for a product update or upgrade, for example.

At step 724, the method determines whether there are any more revisions to the unit. If not, the revisions can be published at step 726. At this point, the draft status set at step 718 is changed to an active status. At this point, runtime operations performed on the unit at step 728 will show the option set item 714.

Figure 13:
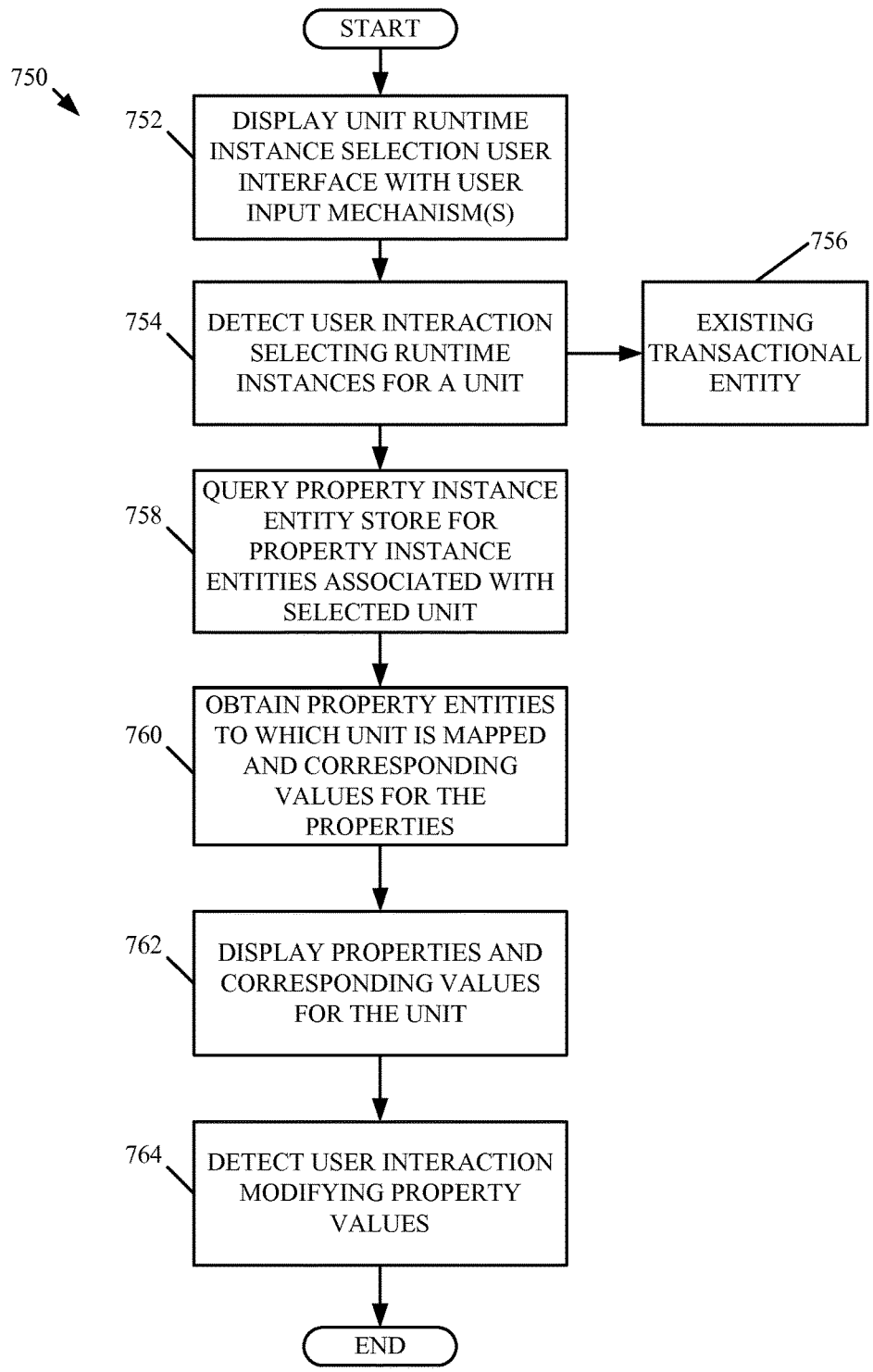
FIG. 13 is a flow diagram of one example of a method for displaying an existing property instance.

FIG. 13 is a flow diagram of one example of a method 750 for displaying an existing property instance. For sake of illustration, but not by limitation, method 750 will be described in the context of displaying a transactional entity, such as an opportunity entity, created for the Tablet X Pro unit prior to option set item 714 (shown in FIG. 12) being added to the color property.

At step 755, a unit runtime instance selection user interface is displayed. At step 754, a user interaction is detected that selects a runtime instance for a unit. As mentioned above, in the present example a user selects the existing transactional entity that includes the Tablet X Pro unit at step 756.

At step 758, the method identifies the property instance entities associated with the selected unit. For example, property surfacing system 144 can query property instance entity table 260 to identify the entities associated with the Tablet X Pro unit.

At step 760, the method obtains the property entities to which the unit is mapped and the corresponding values for those properties. The properties and the corresponding values are displayed at step 762. In the above example, the color property is displayed with red and white option set items (i.e., the black option set item 714 was not added until after the property instance was created). At step 764, the method can detect a user interaction that modifies the property values. For example, a user can select new property values for the properties, if desired.

It can thus be seen that the present description provides significant technical advantages. For example, it provides dynamic property associations that are utilized in surfacing properties at runtime, without having to traverse the unit hierarchy which typically requires a complex database query to identify the properties for a given product. This reduces the required computing time and bandwidth, and can improve the user experience. Further, the property definitions are separated from the property instances which can reduce the required data storage space. Also, architecture 100 provides the ability to define and manage multiple product versions without having to replicate product entities and, using property associations with the properties along with the state of the associations, the products can be provided with dual states for product versioning support.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 14:
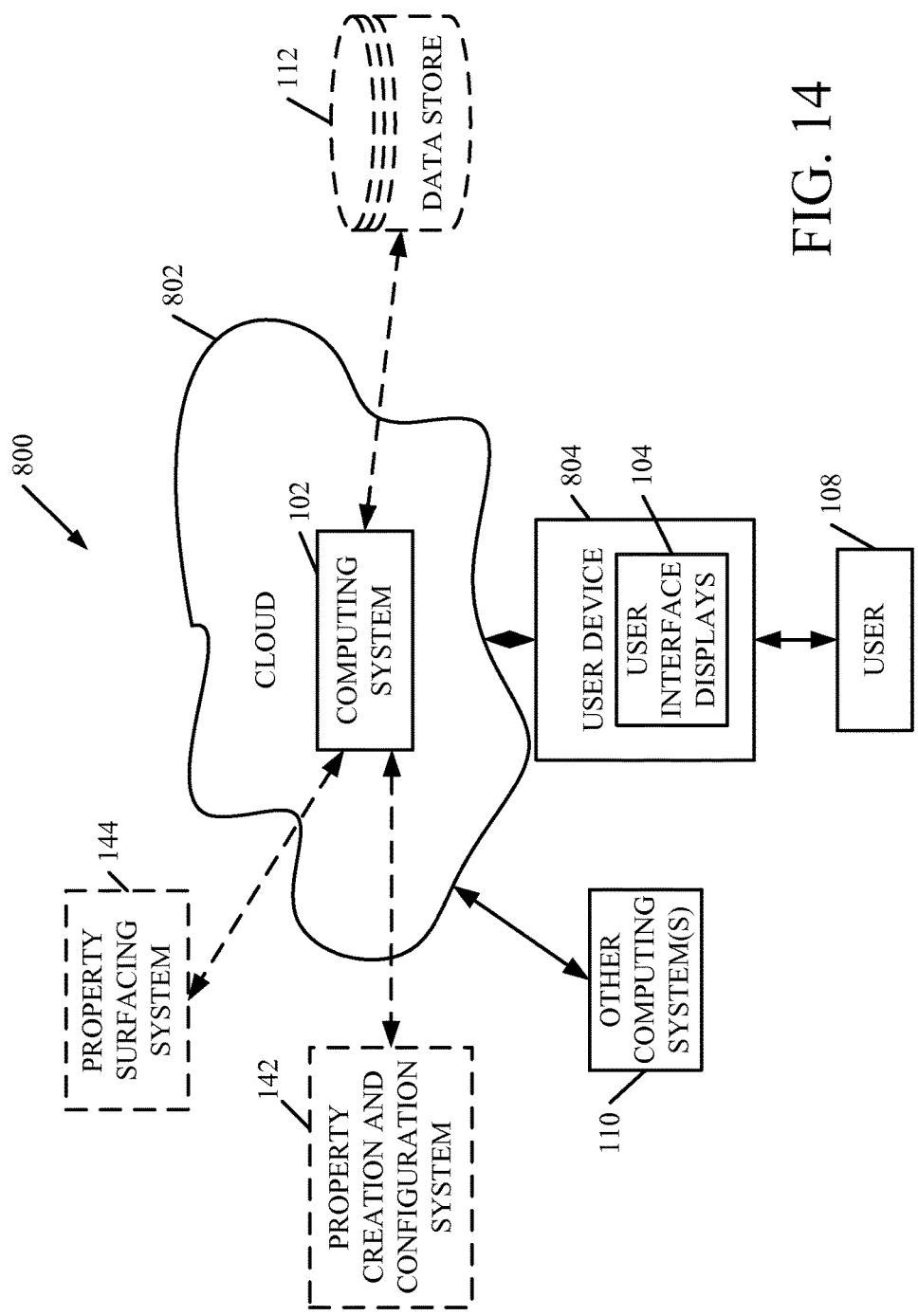
FIG. 14 is a block diagram showing one example of the architecture illustrated in FIG. 1, deployed in a cloud computing architecture.

FIG. 14 is a block diagram of architecture 100, shown in FIG. 1, except that its elements are disposed in a cloud computing architecture 800. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 14, some items are similar to those shown in FIG. 1 and they are similarly numbered. FIG. 14 specifically shows that computing system 102 can be located in cloud 802 (which can be public, private, or a combination where portions are public while others are private). Therefore, user 108 uses a user device 804, respectively, to access those systems through cloud 802. User device 804 renders user interface displays 104 to user 108.

FIG. 14 also depicts another example of a cloud architecture. FIG. 14 shows that it is also contemplated that some elements of architecture 100 can be disposed in cloud 802 while others are not. By way of example, data store 112 can be disposed outside of cloud 802, and accessed through cloud 802. In another example, property creation and configuration system 142 can also be outside of cloud 802, and accessed through cloud 802. In another example, property surface system 144 can also be outside of cloud 802, and accessed through cloud 802. Regardless of where they are located, they can be accessed directly by device 804, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 15:
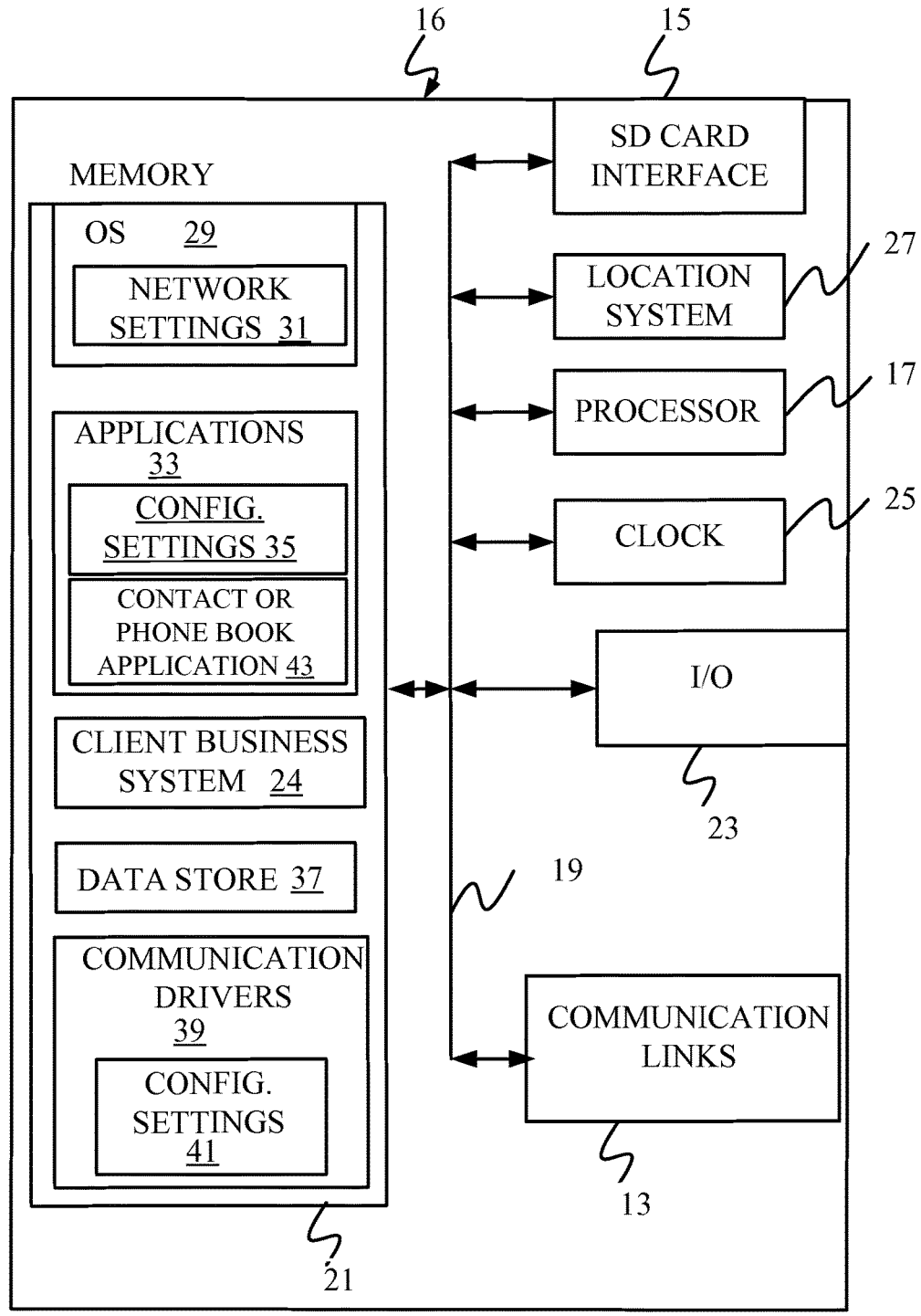
FIGS. 15-17 show various examples of mobile devices that can be used in the architectures discussed in the previous figures.
Figure 16:
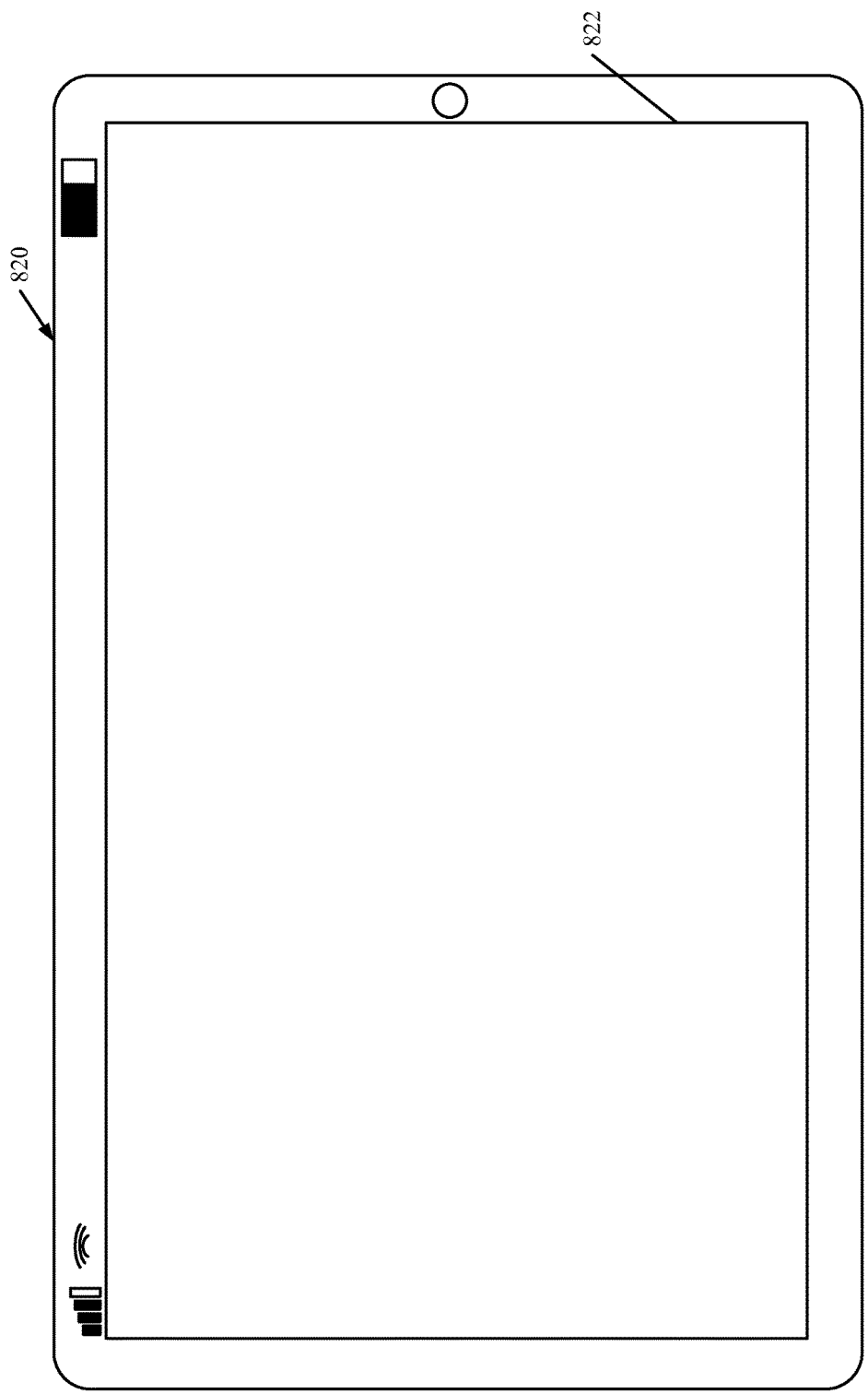
Figure 17:
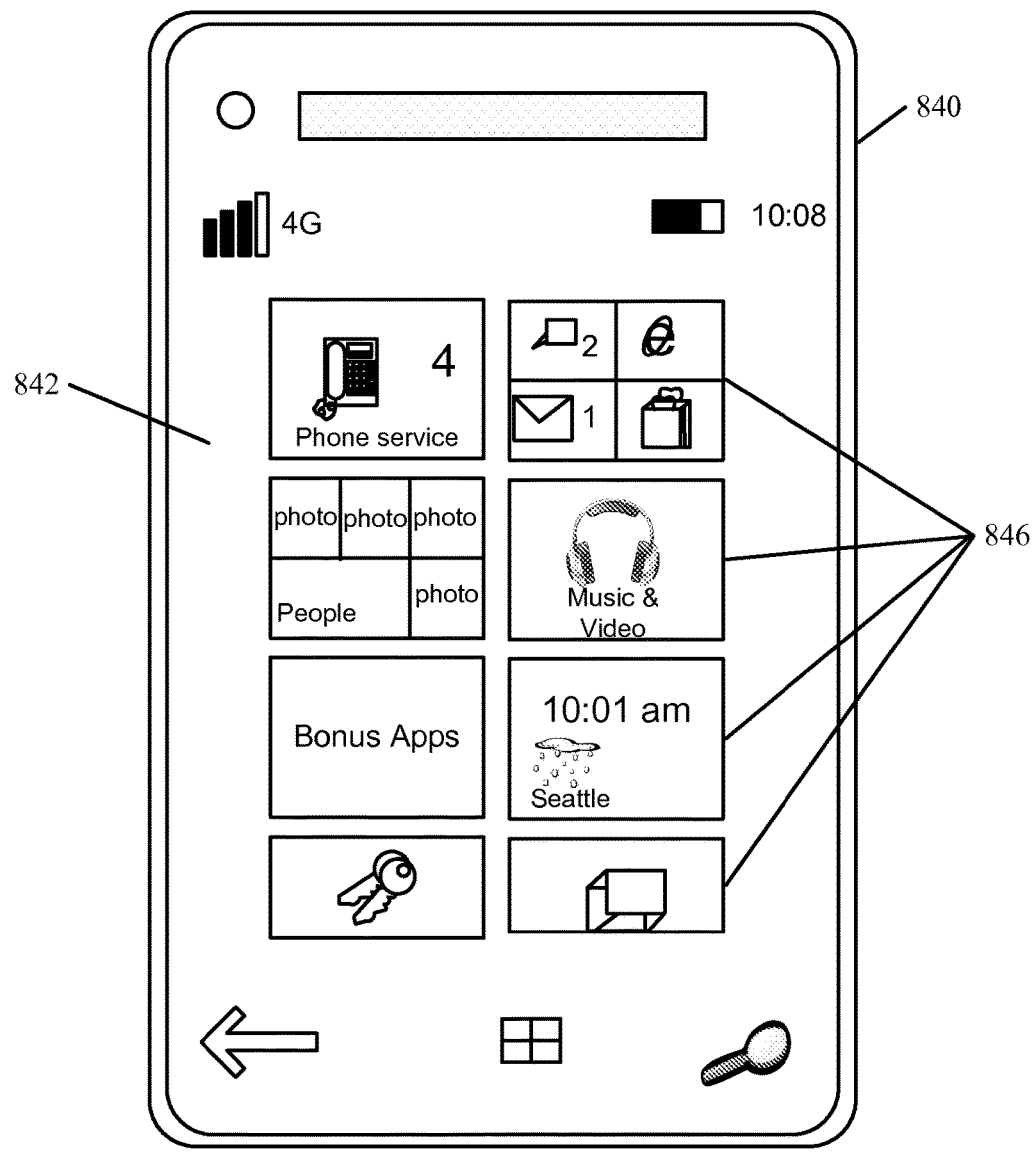

FIG. 15 is a simplified block diagram of one illustrative embodiment of a handheld or mobile computing device that can be used as a user's or client's hand held device 16, in which the present system (or parts of it) can be deployed. FIGS. 16-17 are examples of handheld or mobile devices.

FIG. 15 provides a general block diagram of the components of a client device 16 that can interact with architecture 100. In one example, client device 16 can run components of property creation and configuration system 142 or property surfacing system 144, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1xrtt, and Short Message Service, which are wireless services used to provide cellular access to a network, as well as Wi-Fi protocols, and Bluetooth protocol, which provide local wireless connections to networks.

Under other examples, applications or systems are received on a removable Secure Digital (SD) card that is connected to a SD card interface 15. SD card interface 15 and communication links 13 communicate with a processor 17 (which can also embody processor(s) 134 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 16 shows one embodiment in which device 16 is a tablet computer 820. In FIG. 16, computer 820 is shown with user interface display screen 822. Screen 822 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 820 can also illustratively receive voice inputs as well.

Additional examples of devices 16 can also be used. Device 16 can be a feature phone, smart phone or mobile phone. The phone can include a set of keypads for dialing phone numbers, a display capable of displaying images including application images, icons, web pages, photographs, and video, and control buttons for selecting items shown on the display. The phone includes an antenna for receiving cellular phone signals such as General Packet Radio Service (GPRS) and 1×rtt, and Short Message Service (SMS) signals. In some examples, the phone also includes a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 17 shows that the phone can be a smart phone 840. Smart phone 840 has a touch sensitive display 842 that displays icons or tiles or other user input mechanisms 844. Mechanisms 844 can be used by a user to run applications, make calls, perform data transfer operations, etc. In general, smart phone 840 is built on a mobile operating system and offers more advanced computing capability and connectivity than a feature phone.

Note that other forms of the devices 16 are possible.

Figure 18:
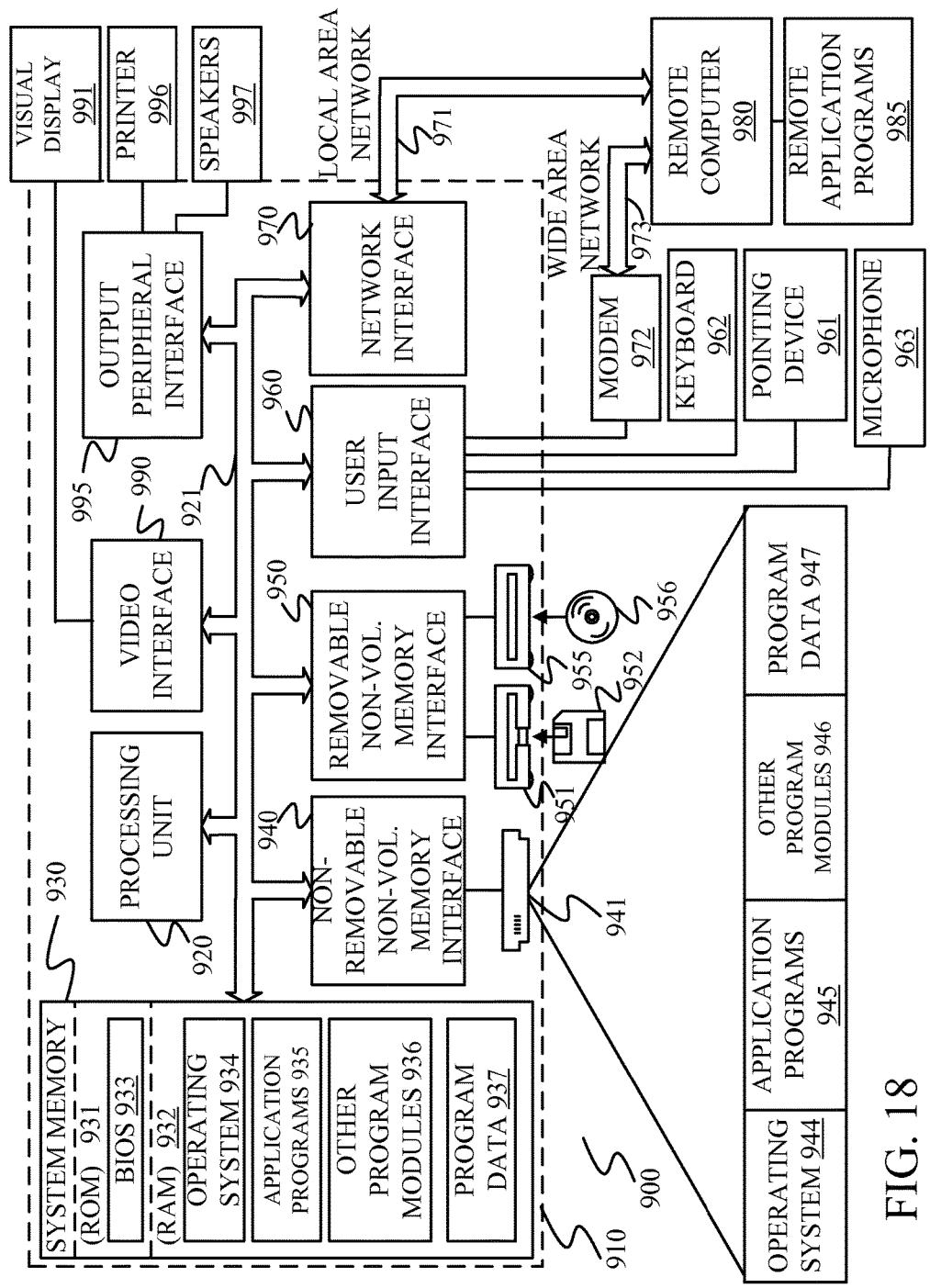
FIG. 18 is a block diagram of one example of a computing environment that can be used in various parts of the architectures set out in the previous figures.

FIG. 18 is one embodiment of a computing environment in which architecture 100, or parts of it, (for example) can be deployed. With reference to FIG. 18, an exemplary system for implementing some embodiments includes a general-purpose computing device in the form of a computer 910. Components of computer 910 may include, but are not limited to, a processing unit 920 (which can comprise any of the processors discussed above), a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 18.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 12 illustrates operating system 934, application programs 935, other program modules 936, and program data 937.

The computer 910 may also include other removable/non-removable volatile/nonvolatile computer storage media. By way of example only, FIG. 18 illustrates a hard disk drive 941 that reads from or writes to non-removable, nonvolatile magnetic media, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and optical disk drive 955 are typically connected to the system bus 921 by a removable memory interface, such as interface 950.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 18, provide storage of computer readable instructions, data structures, program modules and other data for the computer 910. In FIG. 18, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies.

A user may enter commands and information into the computer 910 through input devices such as a keyboard 962, a microphone 963, and a pointing device 961, such as a mouse, trackball or touch pad. Other input devices (not shown) may include a joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A visual display 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 is operated in a networked environment using logical connections to one or more remote computers, such as a remote computer 980. The remote computer 980 may be a personal computer, a hand-held device, a server, a router, a network PC, a peer device or other common network node, and typically includes many or all of the elements described above relative to the computer 910. The logical connections depicted in FIG. 18 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 18 illustrates remote application programs 985 as residing on remote computer 980. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system comprises a display system configured to generate user interface displays and a property surfacing system configured to detect a request to access properties corresponding to a selected unit and to access a unit-property association store that stores one or more association entities. Each association entity associates a property entity with the selected unit. The property surfacing system obtains the properties based on the associated property entity. The computing system comprises a display system controller configured to control the display system to generate a user interface property display that displays the properties.

Example 2 is the computing system of any or all previous examples, wherein the selected unit represents a particular product or service.

Example 3 is the computing system of any or all previous examples, wherein the property entity comprises a dynamic property entity having metadata that defines a set of attributes for a given property of the selected unit.

Example 4 is the computing system of any or all previous examples, wherein the set of attributes comprises at least a data type attribute and a default value attribute.

Example 5 is the computing system of any or all previous examples, wherein the association entity includes a set of attributes comprising at least a property entity attribute that indicates the property entity and a unit attribute that indicates the selected unit.

Example 6 is the computing system of any or all previous examples, wherein the set of attributes comprises an association status attribute and an inheritance type attribute.

Example 7 is the computing system of any or all previous examples, wherein the property surfacing system is configured to identify an association status of each association entity and to surface the properties in the user interface property display based on the association status.

Example 8 is the computing system of any or all previous examples, wherein the property surfacing system is configured to identify a first association entity that associates a first property entity with the selected unit and to identify a second association entity that associates a second property entity with the selected unit, wherein the first association entity has an active association status and the second association entity has an inactive association status.

Example 9 is the computing system of any or all previous examples, and further comprising a property instance entity creation component configured to detect a user runtime interaction relative to the selected unit and to create at least one property instance entity that stores runtime data for the property entity.

Example 10 is the computing system of any or all previous examples, wherein the property instance entity stores a property value defined by the user runtime interaction, and identifiers for the property entity and the selected unit.

Example 11 is a property configuration system comprising a display system controller configured to control a display system to generate a user property definition user interface that receives a user property definition input that defines a property for a given unit, a property component configured to generate a property entity having property attributes for the defined property, and a unit-property association component configured to generate a unit-property association entity that associates the property entity with the given unit.

Example 12 is the property configuration system of any or all previous examples, and further comprising a unit hierarchy component configured to access a unit hierarchy having a plurality of nodes. Each node represents a particular unit or unit category, the plurality of nodes being arranged in a plurality of hierarchical levels. The system further comprises a property inheritance component configured to facilitate property inheritance within the unit hierarchy such that properties assigned to an ancestor node are inherited by a descendent node that depends from the ancestor node.

Example 13 is the property configuration system of any or all previous examples, wherein the given unit inherits a set of properties from a node in the unit hierarchy that is an ancestor node to the given unit, and wherein the user property definition input modifies the set of property by at least one of adding a property to the set of properties or overriding a property in the set of properties.

Example 14 is the property configuration system of any or all previous examples, wherein the unit-property association component generates a second unit-property association entity that associates the property entity with another unit based on the unit hierarchy.

Example 15 is the property configuration system of any or all previous examples, wherein the property entity comprises a first property entity and the unit-property association entity comprises a first unit-property association entity that associates the first property entity with the given unit, and wherein the property component is configured to detect a second user property definition input that defines a second property for the given unit and generate a second property entity for the second property, the unit-property association component generating a second unit-property association entity that associates the second property entity with the given unit.

Example 16 is the property configuration system of any or all previous examples, and further comprising a unit versioning control system configured to assign an active status to the first unit-property association entity and an inactive status to the second unit-property association entity.

Example 17 is a computer-implemented method comprising detecting a request to access properties corresponding to a selected unit and accessing a unit-property association store that stores information associating a set of properties with the selected unit and, for each property in the set of properties, an association status indicating a state of the association between the property and the selected unit. The method comprises generating a user interface display that displays a representation of the set of properties based on the association status for each property.

Example 18 is the computer-implemented method of any or all previous examples, wherein a first association status for a first one of the properties indicates an active association and a second association status for a second one of the properties indicates an inactive association.

Example 19 is the computer-implemented method of any or all previous examples, wherein the user interface display comprises a runtime user interface display that is generated for surfacing properties at runtime, the runtime user interface display being generated to display only the properties in the set of properties that have an active association with the selected unit.

Example 20 is the computer-implemented method of any or all previous examples, and further comprising generating a property configuration user interface display with property configuration user input mechanisms for configuring the set of properties, wherein the property configuration user interface displays properties in the set of properties that have an active association with the selected unit and properties than have an inactive association.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other equivalent features and acts are intended to be within the scope of the claims.

What is claimed is:

1. A computing system comprising:
    a processor; and
    memory storing instructions executable by the processor, wherein the instructions, when executed, configure the computing system to:
        receive a request to perform a computing task associated with a selected unit represented in the computing system;
        based on the request, access a unit-property association store that stores an association record that associates a property record with the selected unit, the association record comprising:
            a unit attribute that identifies the selected unit;
            a property record identification attribute that identifies the property record that is separate from the association record and represents a unit property, and
            an inheritance type attribute;
        access a unit hierarchy comprising hierarchically-related nodes, wherein each node represents a unit, and relationships between nodes represents hierarchical associations between units represented by the nodes;
        based on the inheritance type attribute, determine that the unit property is inherited from a node in the unit hierarchy that represents another unit;
        based on the property record identification attribute, access the property record to identify a set of property attributes that defines the unit property represented by the property record; and
        generate a representation of a user interface display that identifies the set of property attributes.

2. The computing system of claim 1, wherein the selected unit represents a particular product or service.

3. The computing system of claim 1, wherein the property record comprises a dynamic property record having metadata that defines the set of property attributes for the unit property.

4. The computing system of claim 3, wherein the set of property attributes comprises at least a data type attribute and a default value attribute.

5. The computing system of claim 1, wherein the property record identification attribute comprises a pointer to the property record, and the user interface display comprises a user input mechanism corresponding to the unit property.

6. The computing system of claim 5, wherein the instructions, when executed, configure the computing system to:
    based on an indication of a user input through the user input mechanism, define a value for the unit property.

7. The computing system of claim 1, wherein the instructions, when executed, configure the computing system to:
    identify an association status of the association record; and
    based on the association status, generate a display element that represents the unit property in the user interface display.

8. The computing system of claim 7, wherein the instructions, when executed, configure the computing system to:
    identify a first association record that indicates that a first property record has an active association with the selected unit; and
    identify a second association record that indicates that a second property record has an inactive association with the selected unit.

9. The computing system of claim 1, wherein the instructions, when executed, configure the computing system to:
    receive an indication of a user runtime interaction relative to the selected unit; and
    based on the indication of the user runtime interaction, create a property instance record that stores runtime data for a runtime instance of the property record.

10. The computing system of claim 9, wherein the property instance record stores a property value defined by the user runtime interaction, and identifiers for the property record and the selected unit.

11. A computing system comprising:
a processor; and
memory storing instructions executable by the processor, wherein the instructions, when executed, configure the computing system to provide:
 a property component configured to:
  based on an indication of a property definition input, define a unit property for a given unit; and
  generate a property record having property attributes for the defined unit property; and
 a unit-property association component configured to generate a unit-property association record that associates the property record with the given unit, and includes an inheritance type attribute;
 a unit hierarchy component configured to access a unit hierarchy having a plurality of nodes, each node representing a particular unit or unit category, the plurality of nodes being arranged in a plurality of hierarchical levels and relationships between nodes represents hierarchical associations between units represented by the nodes; and
 a property inheritance component configured to:
  based on the inheritance type attribute, determine that the unit property is inherited from a node in the unit hierarchy that represents another unit; and
 a display system configured to generate a representation of a user interface display that represents the unit property based on the property attributes.

12. The computing system of claim 11, wherein the given unit inherits a set of unit properties from a node in the unit hierarchy that is an ancestor node to the given unit, and wherein the user property definition input modifies the set of unit property by at least one of adding a unit property to the set of unit properties or overriding a unit property in the set of unit properties.

13. The computing system of claim 11, wherein the unit-property association component is configured to generate a second unit-property association record that associates the property record with another unit based on the unit hierarchy.

14. The computing system of claim 11, wherein the property record comprises a first property record and the unit-property association record comprises a first unit-property association record that associates the first property record with the given unit, and wherein the property component is configured to detect a second user property definition input that defines a second unit property for the given unit and generate a second property record for the second property, the unit-property association component being configured to generate a second unit-property association record that associates the second property record with the given unit.

15. The computing system of claim 14, wherein the instructions configure the computing system to provide:
 a unit versioning control system configured to assign an active status to the first unit-property association record and an inactive status to the second unit-property association record.

16. A computer-implemented method comprising:
receiving an indication of a request to access properties corresponding to a selected unit;
accessing a unit-property association store that stores an association record that associates a property record with the selected unit, the association record comprising:
 a unit attribute that identifies the selected unit;
 a property record identification attribute that identifies a property record that is separate from the association record and represents a unit property;
 an association status attribute indicating a state of the association between the property record and the selected unit;
 an inheritance type attribute; and
based on the association status attribute indicating an active association, accessing the property record using the property record identification attribute to identify a set of property attributes that define the unit property represented by the property record;
accessing a unit hierarchy comprising hierarchically-related nodes, wherein each node represents a unit, and relationships between nodes represents hierarchical associations between units represented by the nodes;
based on the inheritance type attribute, determining that the unit property is inherited from a node in the unit hierarchy that represents another unit; and
generating a representation of a user interface display that represents the set of properties attributes.

17. The computer-implemented method of claim 16, wherein the representation of the user interface display comprises a representation of a runtime user interface display that is associated with a runtime environment and includes a display element representing only properties that have an active association with the selected unit.

18. The computer-implemented method of claim 17, and further comprising:
generating a representation of a property configuration user interface display comprising:
 a property configuration user input mechanism for configuring a set of unit properties, and
 a display element that represents unit properties in the set of unit properties that have an active association with the selected unit and unit properties than have an inactive association.

* * * * *